US012154492B2

(12) United States Patent
Muto

(10) Patent No.: US 12,154,492 B2
(45) Date of Patent: Nov. 26, 2024

(54) LIGHT EMITTING DEVICE, DISPLAY DEVICE, PHOTOELECTRIC CONVERSION DEVICE, ELECTRONIC APPARATUS, ILLUMINATION DEVICE, AND MOVING BODY

(71) Applicant: CANON KABUSHIKI KAISHA, Tokyo (JP)

(72) Inventor: Takashi Muto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/411,494

(22) Filed: Jan. 12, 2024

(65) Prior Publication Data

US 2024/0249666 A1 Jul. 25, 2024

(30) Foreign Application Priority Data

Jan. 23, 2023 (JP) ................................ 2023-008182

(51) Int. Cl.
*G09G 5/10* (2006.01)
*G09G 3/32* (2016.01)

(52) U.S. Cl.
CPC ....... *G09G 3/32* (2013.01); *G09G 2300/0842* (2013.01); *G09G 2300/0861* (2013.01); *G09G 2320/0233* (2013.01); *G09G 2320/0238* (2013.01); *G09G 2320/046* (2013.01)

(58) Field of Classification Search
CPC ... G09G 2300/0842; G09G 2300/0861; G09G 2320/0233; G09G 2320/0238; G09G 2320/046
See application file for complete search history.

(56) References Cited

U.S. PATENT DOCUMENTS 7,760,181 B2 7/2010 Nakamura
7,777,698 B2 8/2010 Takahara
7,932,880 B2 4/2011 Takahara
8,063,855 B2 11/2011 Takahara
9,183,778 B2 11/2015 Lee
9,693,045 B2 6/2017 Lee
10,998,392 B2 * 5/2021 Tsuboi ................ H01L 27/1222
11,062,641 B2 7/2021 Yamasaki
(Continued)

FOREIGN PATENT DOCUMENTS

JP 2007-114476 A 5/2007
JP 2008-225506 A 9/2008
(Continued)

*Primary Examiner* — Joe H Cheng
(74) *Attorney, Agent, or Firm* — Venable LLP

(57) ABSTRACT

A light emitting device is provided. The device includes a plurality of pixels, each pixel including a light emitting element and a driving transistor configured to supply a current corresponding to a luminance signal to the light emitting element and a driving circuit including a scanning circuit configured to perform write scanning of scanning the plurality of pixels on a row basis and writing the luminance signal in a gate of the driving transistor. The driving circuit performs, only during a period from an activation of the light emitting device to a start of the write scanning when the write scanning is performed for a first time, a signal write operation of collectively writing a predetermined signal in the gates of the driving transistors included in pixels arranged in not less than two rows among the plurality of pixels.

22 Claims, 19 Drawing Sheets

(56) References Cited

U.S. PATENT DOCUMENTS

| | | | | |
|---|---|---|---|---|
| 11,087,680 | B2 * | 8/2021 | Tsuboi | G09G 3/3233 |
| 11,521,540 | B2 | 12/2022 | Muto | |
| 11,568,811 | B2 | 1/2023 | Kim | |
| 12,027,123 | B2 * | 7/2024 | Yamamoto | G09G 3/3233 |
| 2005/0168491 | A1 | 8/2005 | Takahara | |
| 2005/0180083 | A1 | 8/2005 | Takahara | |
| 2007/0091033 | A1 | 4/2007 | Nakamura | |
| 2008/0084365 | A1 | 4/2008 | Takahara | |
| 2010/0277401 | A1 | 11/2010 | Takahara | |
| 2011/0025586 | A1 | 2/2011 | Lee | |
| 2011/0109664 | A1 * | 5/2011 | Toyomura | G09G 3/3225 345/690 |
| 2015/0077441 | A1 * | 3/2015 | Toyomura | G09G 3/3233 345/690 |
| 2016/0037156 | A1 | 2/2016 | Lee | |
| 2020/0126481 | A1 * | 4/2020 | Tsuboi | H01L 27/1222 |
| 2021/0111227 | A1 * | 4/2021 | Tsuboi | H10K 59/1213 |
| 2021/0375233 | A1 * | 12/2021 | Nagasaki | G09G 3/3233 |
| 2021/0398489 | A1 | 12/2021 | Kim | |
| 2022/0108658 | A1 | 4/2022 | Muto | |
| 2022/0172679 | A1 * | 6/2022 | Akiyama | G09G 3/3233 |
| 2022/0223120 | A1 * | 7/2022 | Tsuboi | G09G 5/10 |
| 2023/0343292 | A1 * | 10/2023 | Komazawa | G09G 3/3233 |

FOREIGN PATENT DOCUMENTS

| | | | |
|---|---|---|---|
| JP | 2011-034038 | A | 2/2011 |
| JP | 2022-001937 | A | 1/2022 |

* cited by examiner

LIGHT EMITTING DEVICE, DISPLAY DEVICE, PHOTOELECTRIC CONVERSION DEVICE, ELECTRONIC APPARATUS, ILLUMINATION DEVICE, AND MOVING BODY

This application is claims priority under 35 U.S.C. § 119 of Japanese Application No. JP2023-008182 filed on Jan. 23, 2023, the disclosure of which is incorporated by reference.

BACKGROUND OF THE INVENTION

Field of the Invention

The present invention relates to a light emitting device, a display device, a photoelectric conversion device, an electronic apparatus, an illumination device, and a moving body.

Description of the Related Art

When activating a light emitting device, the gate potential of a driving transistor that supplies a current corresponding to an illuminance signal to a light emitting element may become unstable, and a bright line or the like may partially appear. Japanese Patent Laid-Open No. 2007-114476 describes that, upon powering-on, a signal voltage is written in all pixel circuits in a display unit to maintain excellent image quality at the powering-on.

SUMMARY OF THE INVENTION

In the driving method described in Japanese Patent Laid-Open No. 2007-114476, since write scanning for one frame is performed during the period from the powering-on to the start of image display, it takes time to start image display.

Some embodiments of the present invention provide a technique advantageous in shortening the time required from the activation to the image display while maintaining image quality at the time of activation.

According to some embodiments, a light emitting device comprising: a plurality of pixels arranged so as to form a plurality of rows and a plurality of columns, each pixel including a light emitting element and a driving transistor configured to supply a current corresponding to a luminance signal to the light emitting element; and a driving circuit comprising a scanning circuit configured to perform write scanning of scanning the plurality of pixels on a row basis and writing the luminance signal in a gate of the driving transistor, wherein the driving circuit performs, only during a period from an activation of the light emitting device to a start of the write scanning when the write scanning is performed for a first time, a signal write operation of collectively writing a predetermined signal in the gates of the driving transistors included in pixels arranged in not less than two rows among the plurality of pixels, is provided.

According to some other embodiments, a light emitting device comprising: a plurality of pixels arranged so as to form a plurality of rows and a plurality of columns, each pixel including a light emitting element and a driving transistor configured to supply a current corresponding to a luminance signal to the light emitting element; and a driving circuit comprising a scanning circuit configured to perform write scanning of scanning the plurality of pixels on a row basis and writing the luminance signal in a gate of the driving transistor, wherein the driving circuit further includes a write circuit configured to perform, only during a period from an activation of the light emitting device to a start of the write scanning when the write scanning is performed for a first time, a signal write operation of writing a predetermined signal in the gate of the driving transistor included in a pixel arranged in at least one row among the plurality of pixels without performing scanning using the scanning circuit, is provided.

Further features of the present invention will become apparent from the following description of exemplary embodiments (with reference to the attached drawings).

DESCRIPTION OF THE EMBODIMENTS

Figure 1:
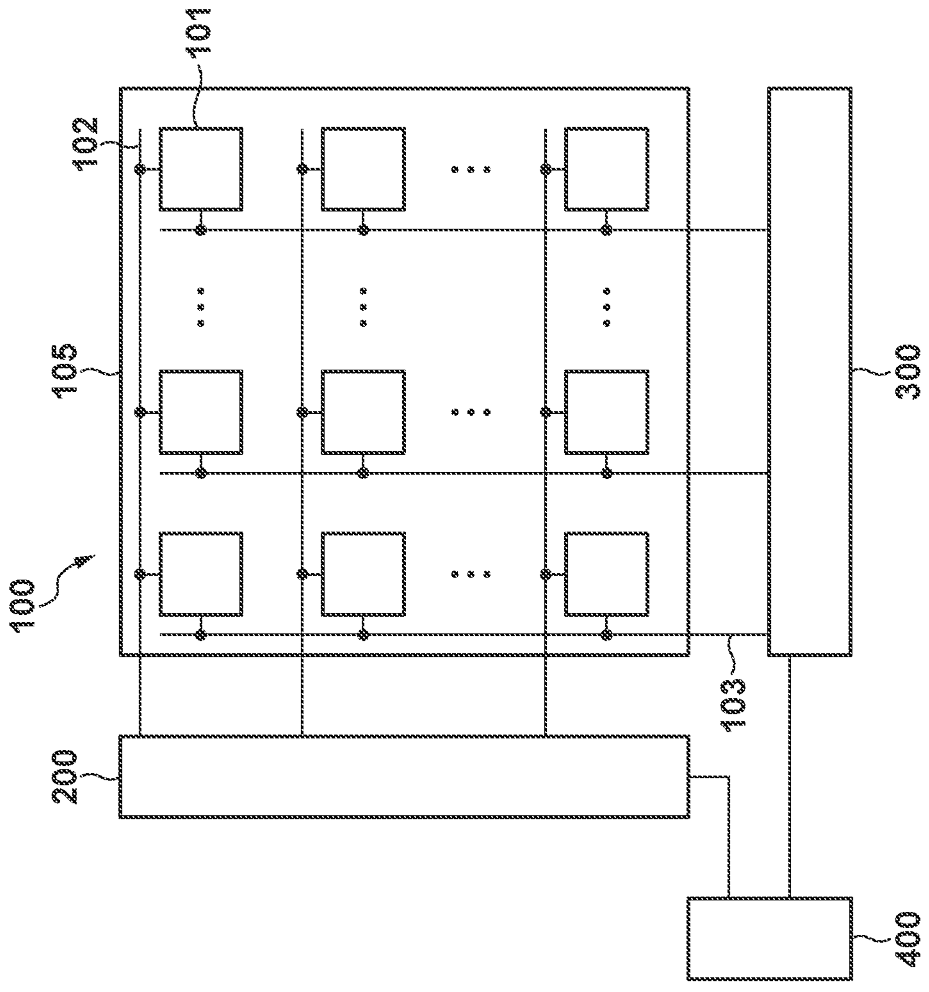
FIG. 1 is a view showing an example of the arrangement of a light emitting device according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A light emitting device according to an embodiment of the present disclosure will be described with reference to FIGS. 1 to 17. FIG. 1 is a schematic view showing an example of the arrangement of a light emitting device 100 according to this embodiment. The light emitting device 100 includes a pixel array 105, a driving circuit 200, a signal output circuit 300, and a control circuit 400. The pixel array 105 includes a plurality of pixels 101 arranged so as to form a plurality of rows and a plurality of columns. Each of the plurality of pixels 101 includes a light emitting element and a driving transistor that supplies a current corresponding to a luminance signal to the light emitting element. Details will be described later. The light emitting element can be, for example, an organic electroluminescence (EL) element, a light emitting diode (LED), a semiconductor laser element, or the like.

Each of the plurality of pixels 101 is connected to the driving circuit 200 via a scanning line 102 commonly arranged for each row in correspondence with the pixels arranged in the row direction (the row direction is the horizontal direction in FIG. 1) among the plurality of pixels 101. Further, each of the plurality of pixels 101 is connected to the signal output circuit 300 via a signal line 103 commonly arranged for each column in correspondence with the pixels arranged in the column direction (the column direction is the vertical direction in FIG. 1) among the plurality of pixels 101.

The control circuit 400 controls the driving circuit 200 and the signal output circuit 300. The signal output circuit 300 supplies a luminance signal to the pixel 101 via the signal line 103 under the control of the control circuit 400. The driving circuit 200 selects, under the control of the control circuit 400, the row (to be sometimes referred to as the write row hereinafter) to write the luminance signal from the pixel array 105 among the plurality of pixels 101. The individual luminance signal for each column is written in the pixel 101 arranged in the selected write row from the signal output circuit 300 via the signal line 103, and the light emitting element emits light with the luminance corresponding to the luminance signal.

Figure 2:
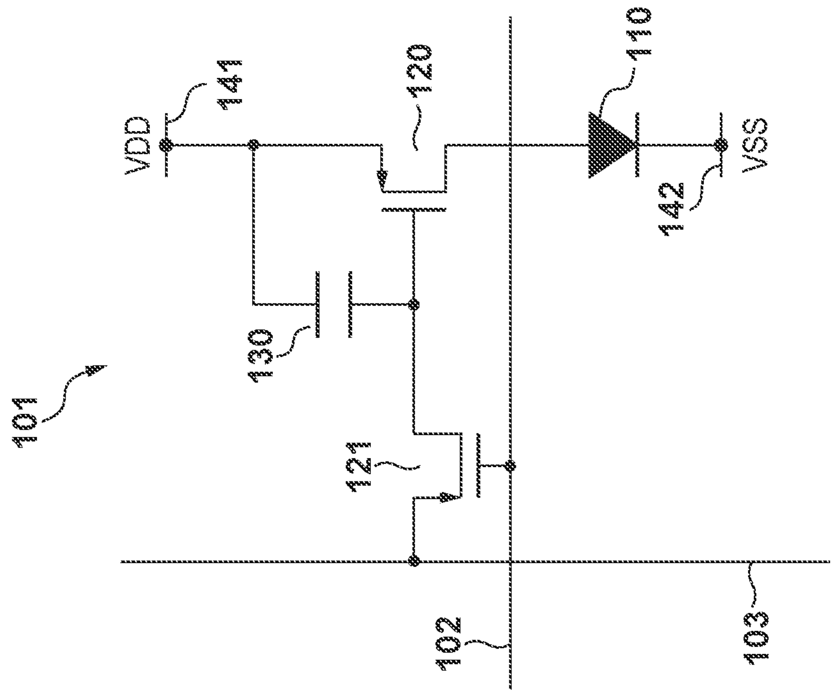
FIG. 2 is a view showing an example of the arrangement of a pixel of the light emitting device shown in FIG. 1.

FIG. 2 is a view showing an example of the arrangement of the pixel 101 in this embodiment. The pixel 101 can include a light emitting element 110, a driving transistor 120, a write transistor 121, and a capacitive element 130. It will be described below that each of the driving transistor 120 and the write transistor 121 is a p-type transistor, but an n-type transistor may also be used. In this case, the potential and polarity described below can be reversed, as appropriate. For example, the source and the drain of each transistor may be replaced with each other.

The source of the driving transistor 120 is connected to a power supply line 141 that supplies a potential VDD. The drain of the driving transistor 120 is connected to the anode of the light emitting element 110 whose cathode is connected to a power supply line 142 that supplies a potential VSS. The potential VDD supplied to the power supply line 141 can be a positive potential. The potential VSS supplied to the power supply line 142 can be a potential lower than the potential VDD. For example, the potential VSS may be a grand potential. A current path including the light emitting element 110 and the driving transistor 120 is arranged between the power supply line 141 and the power supply line 142.

The gate of the driving transistor 120 is connected to the other terminal of two terminals of the capacitive element 130 whose one terminal is connected to the power supply line 141. The gate of the driving transistor 120 is further connected to the drain of the write transistor 121. The source of the write transistor 121 is connected to the signal line 103. The gate of the write transistor 121 is connected to the scanning line 102.

In the arrangement described above, the write transistor 121 arranged between the gate of the driving transistor 120 and the signal line 103 is controlled to be turned on or off by the driving circuit 200. When the driving circuit 200 turns on the write transistor 121, the luminance signal output from the signal output circuit 300 to the signal line 103 of each column is input to the capacitive element 130, and writing of the luminance signal in the pixel 101 (the gate of the driving transistor 120) is started. Thereafter, when the driving circuit 200 turns off the write transistor 121, the capacitive element 130 holds the written luminance signal, and writing of the luminance signal in the pixel 101 (the gate of the driving transistor 120) is completed. The light emission luminance of the light emitting element 110 is decided by the current supplied from the drain of the driving transistor 120. Therefore, the light emitting element 110 emits light with the luminance corresponding to the luminance signal written in the gate of the driving transistor 120.

Figure 3:
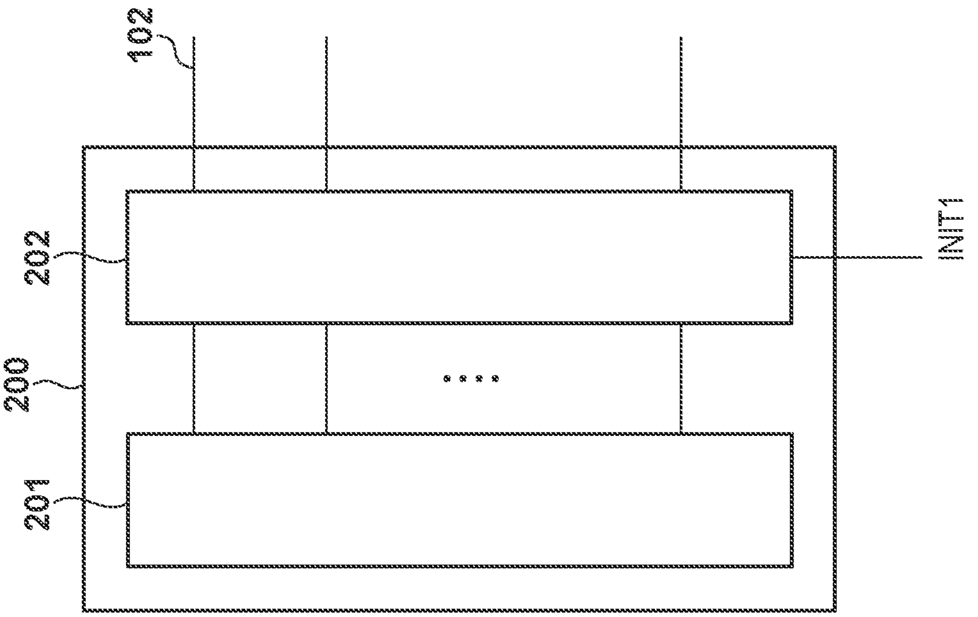
FIG. 3 is a view showing an example of the arrangement of a driving circuit of the light emitting device shown in FIG. 1.

FIG. 3 is a view showing an example of the arrangement of the driving circuit 200 in this embodiment. The driving circuit 200 includes a scanning circuit 201 and a write circuit 202. The scanning circuit 201 is provided with an output for each row, and sequentially selects the write row. That is, the scanning circuit 201 performs write scanning of scanning the plurality of pixels 101 on a row basis and writing the luminance signal supplied from the signal output circuit 300 in the gate of the driving transistor 120. The write circuit 202 controls writing of the pixel 101 via the scanning line 102 based on the output of the scanning circuit 201 and a control signal INIT1 supplied from the control circuit 400.

Figure 4:
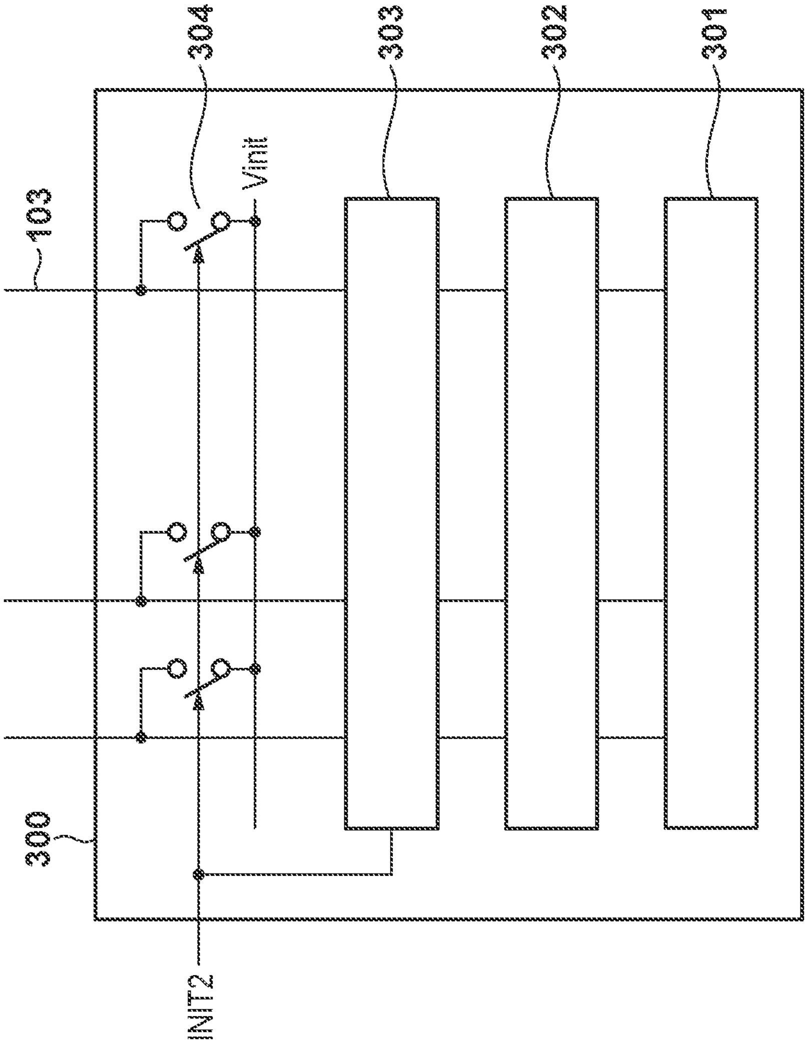
FIG. 4 is a view showing an example of the arrangement of a signal output circuit of the light emitting device shown in FIG. 1.

FIG. 4 is a view showing an example of the arrangement of the signal output circuit 300 in this embodiment. The signal output circuit 300 can include a horizontal scanning circuit 301, a DAC circuit 302, and a driver circuit 303. Image signals are sequentially input from the control circuit 400 to the horizontal scanning circuit 301 for each column. The horizontal scanning circuit 301 divides the input image signals into corresponding columns and holds them. The DAC circuit 302 converts the held image signal into an analog signal voltage for each column. The driver circuit 303 buffers the converted analog signal voltage for each column, and outputs it to the corresponding signal line 103 as the luminance signal. A potential Vinit is supplied to, via a switch 304, the output node of the driver circuit 303 which outputs the luminance signal to the signal line 103. The switch 304 is controlled to be turned on or off by a control signal INIT2 output from the control circuit 400. The control signal INIT2 also controls the output state of the driver circuit 303.

Figure 5:
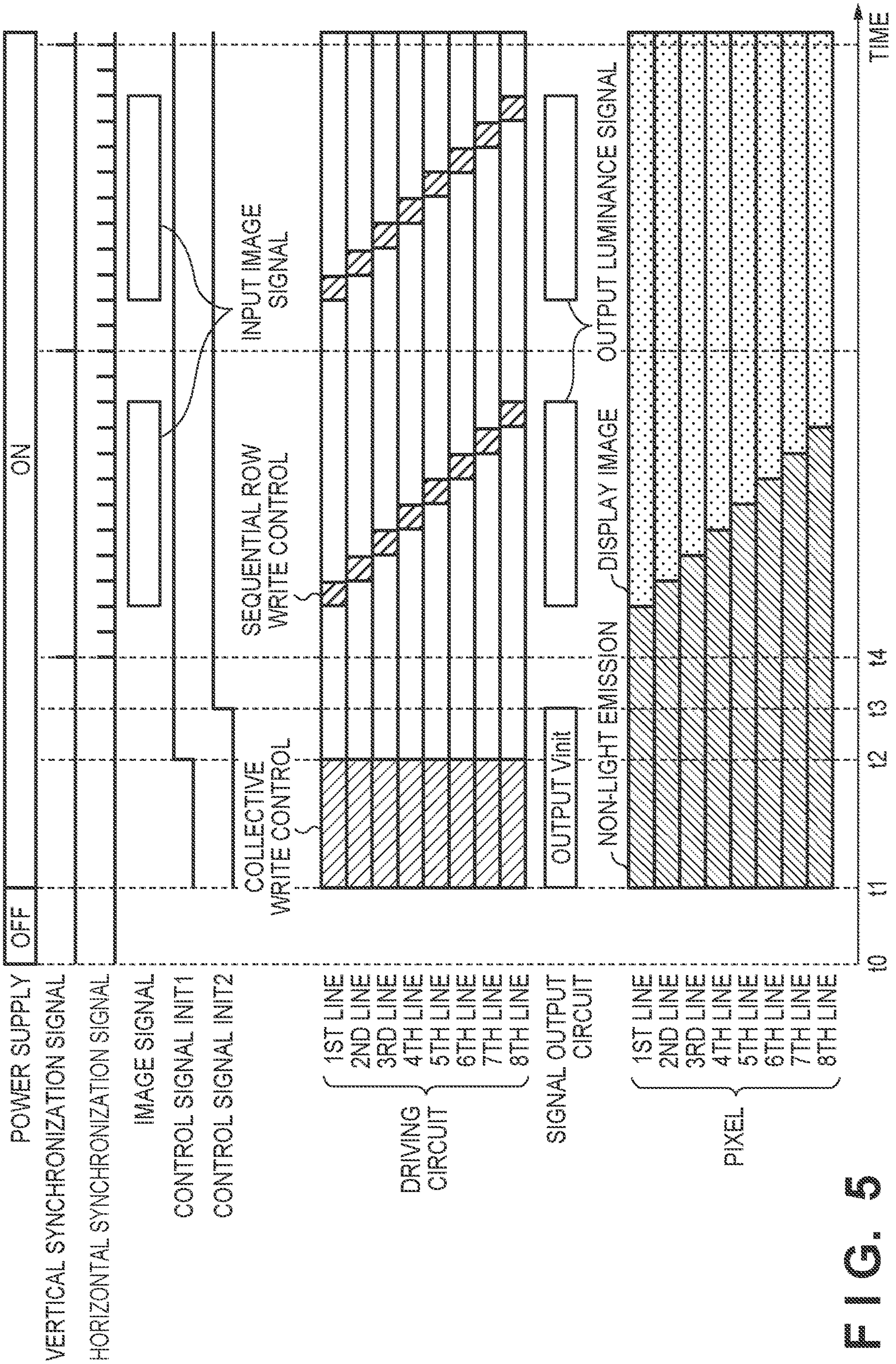
FIG. 5 is a timing chart showing an example of the operation of the light emitting device shown in FIG. 1.

Next, the operation from the activation of the light emitting device 100 to the start of display (to be sometimes referred to as image display hereinafter) corresponding to the image signal will be described with reference to an operation timing chart. FIG. 5 is a timing chart showing an example of the operation of the light emitting device 100 in this embodiment. For the sake of descriptive convenience, the number of rows of the pixels 101 arranged in the pixel array 105 is illustrated as eight.

At time t0, the power supply of the light emitting device 100 is in the OFF state. At time t1, the light emitting device 100 is activated (the power supply transitions to the ON state), and it is started to supply the potential VDD to the power supply line 141. When the potential VDD is applied to the power supply line 141, the control circuit 400 controls both the control signal INIT1 and the control signal INIT2 to LO level.

When LO level is supplied as the control signal INIT1, the write circuit 202 of the driving circuit 200 supplies, to all the scanning lines 102, a signal that turns on the write transistor 121, thereby turning on the write transistor 121. Further, when LO level is supplied as the control signal INIT2, the switch 304 is turned on in the signal output circuit 300, and the potential Vinit is supplied to the signal line 103. With this, the write circuit 202 of the driving circuit 200 performs a signal write operation of collectively writing the potential Vinit as a predetermined signal in all pixels of the plurality of pixels 101 arranged in the pixel array 105. As a result, the potential Vinit is written in the gates of the driving transistors 120 of all the pixels 101.

At time t2 after a predetermined time from time t1, the control signal INIT1 is set at HI level. When the control signal INIT1 is set at HI level, the write circuit 202 of the driving circuit 200 turns off the write transistor 121 via the scanning line 102. At this point of time, writing of the predetermined signal (potential Vinit) in the pixel 101 is completed. Then, at time t3, the control signal INIT2 is set at HI level. When the control signal INIT2 is set at HI level, the buffer function of the driver circuit 303 is enabled in the signal output circuit 300, and the driver circuit 303 can output the luminance signal corresponding to the image signal for subsequent image display.

Then, at time t4, a vertical synchronization signal and a horizontal synchronization signal are generated by the control circuit 400, and the image signal is input after a predetermined blanking period. In accordance with this, image display is started. More specifically, the signal output circuit 300 outputs, as the luminance signal, the analog voltage signal based on the image signal to the signal line 103. The driving circuit 200 sequentially selects the write row for each horizontal period. It can also be said that when the control signal INIT1 is set at HI level, the write circuit 202 of the driving circuit 200 controls writing of the pixel 101 via the scanning line 102 based on the signal output by the scanning circuit 201.

Here, give attention to the period from time t1, at which the light emitting device 100 is activated and the potential VDD is supplied to the power supply line 141, to the start of image display. During this period, the potential Vinit is continuously applied as the predetermined signal to the gates of the driving transistors 120 of all the pixels 101. In this embodiment, the potential Vinit is set to a non-light emission potential. The non-light emission potential refers to the potential with which the light emission of the light emitting element 110 is at a visually unrecognizable level even if the potential is input to the gate of the driving transistor 120, or the potential with which the light emission is at a level without the sense of incongruity even if light is emitted at the time of activation of the light emitting device 100. Examples of the non-light emission potential are a potential that sets the luminance of the light emitting element 110 to 0.1 cd/$m^2$ or less, which is difficult to visually recognize, a potential that sets the luminance of the light emitting element to the black level in the luminance signal or less, and the like.

In this manner, the driving circuit 200 collectively writes the potential Vinit as the predetermined signal in the gates of the driving transistors 120 of the plurality of pixels 101 during the period from the activation of the light emitting device 100 to the time at which image display is started by write scanning in which the scanning circuit 201 scans the plurality of pixels 101 on a row basis and writes the luminance signal in the gate of each driving transistor 120. Accordingly, the driving circuit 200 includes the write circuit 202 that writes the predetermined signal in the gates of the driving transistors 120 of the plurality of pixels 101 without performing scanning using the scanning circuit 201 during the period from the activation of the light emitting device 100 to the start of write scanning by the scanning circuit 201. By setting the potential Vinit to the non-light emission potential, the pixel 101 can be maintained in the non-light emission state until the start of image display. In this manner, during the period from the activation of the light emitting device 100 to the start of image display, light emission at the time of activation can be suppressed without performing row scanning using the scanning circuit 201. Further, in this embodiment, the potential Vinit is collectively supplied to the pixels 101 arranged in the pixel array 105. Hence, the time from the activation of the light emitting device 100 to the start of image display can be shortened as compared to a case in which the potential Vinit is supplied by performing scanning for one frame by using the scanning circuit 201. That is, it is possible to shorten the time from the activation to the image display while maintaining image quality at the time of activation of the light emitting device 100.

In the arrangement of the light emitting device 100 described above, the potential Vinit supplied, as the predetermined signal, to the gate of the driving transistor 120 of each pixel 101 at the time of activation of the light emitting device 100 may be the same potential as the potential VDD supplied to the power supply line 141. The power supply line for supplying the potential Vinit shown in FIG. 4 and the power supply line 141 may be supplied with the potential from a common power supply. For example, the power supply line for supplying the potential Vinit shown in FIG. 4 may branch from the power supply line 141. By making the power supply line for supplying the potential Vinit common with the power supply line 141, the wiring patterns arranged in the pixel array 105 can be reduced as compared to a case in which these power supply lines are separately arranged.

When the potential Vinit is the same potential as the potential VDD, the voltage applied between the gate and the source of the driving transistor 120 is about 0 V. Accordingly, also in the case in which the potential VDD is used as the potential Vinit, the pixel 101 is set in the non-light emission state as in the arrangement example described above, and an effect similar to that described above can be obtained.

Here, strictly speaking, even if the same potential is supplied, a difference can be generated between the potential Vinit and the potential VDD due to a voltage drop caused by a wiring resistance in the power supply line 141 or the power supply line for supplying the potential Vinit, or the like. Here, it is defined that the potential Vinit and the potential VDD are the same potential while including the difference described above.

Further, in the arrangement described above, at the time of activation of the light emitting device 100, the potential Vinit is input to the gate of the driving transistor 120 via the signal line 103 and the write transistor 121, but the present invention is not limited to this. A signal line to which the above-described potential Vinit is supplied as the predetermined signal may be arranged separately from the signal line 103, and an additional write transistor different from the write transistor 121 may be arranged, in the pixel 101, between the gate of the driving transistor 120 and the signal line to which the potential Vinit is supplied. With this, during the period from the activation of the light emitting device 100 to the start of write scanning for image display using the scanning circuit 201, the write circuit 202 of the driving circuit 200 turns on the additional write transistor, and the potential Vinit is written in the gate of the driving transistor 120 as the predetermined signal.

Further, in the arrangement described above, the case has been described in which signals different from each other are supplied as the control signal INIT1 and the control signal INIT2 from the control circuit 400, but the present invention is not limited to this. For example, the control circuit 400 may supply the same signal as the control signal INIT1 and the control signal INIT2. It is only required that the driving circuit 200 can turn off the write transistor 121 after the predetermined signal (potential Vinit) is written in the gate of the driving transistor 120 and before the signal supplied from the signal output circuit 300 to the signal line 103 is changed from the predetermined signal (potential Vinit). If the same signal is supplied as the control signal INIT1 and the control signal INIT2, for example, a buffer circuit that delays the control signal INIT2, or the like may be arranged in the node of the signal output circuit 300 to which the control signal INIT2 is input.

In this embodiment, in accordance with the activation of the light emitting device 100, the driving circuit 200 performs a signal write operation of writing the predetermined signal (potential Vinit) in the gate of the driving transistor 120 of each pixel 101 in accordance with the control signals INIT1 and INIT2 supplied from the control circuit 400. However, if the driving circuit 200 can perform the signal write operation in accordance with the activation of the light emitting device 100, another control signal may be used. For example, a signal that causes the driving circuit 200 to start the signal write operation may be supplied from the outside of the light emitting device 100. Alternatively, for example, the driving circuit 200 may start the signal write operation by using, as a trigger, the activation (for example, powering-on or return from a sleep state) of the light emitting device 100.

Figure 6:
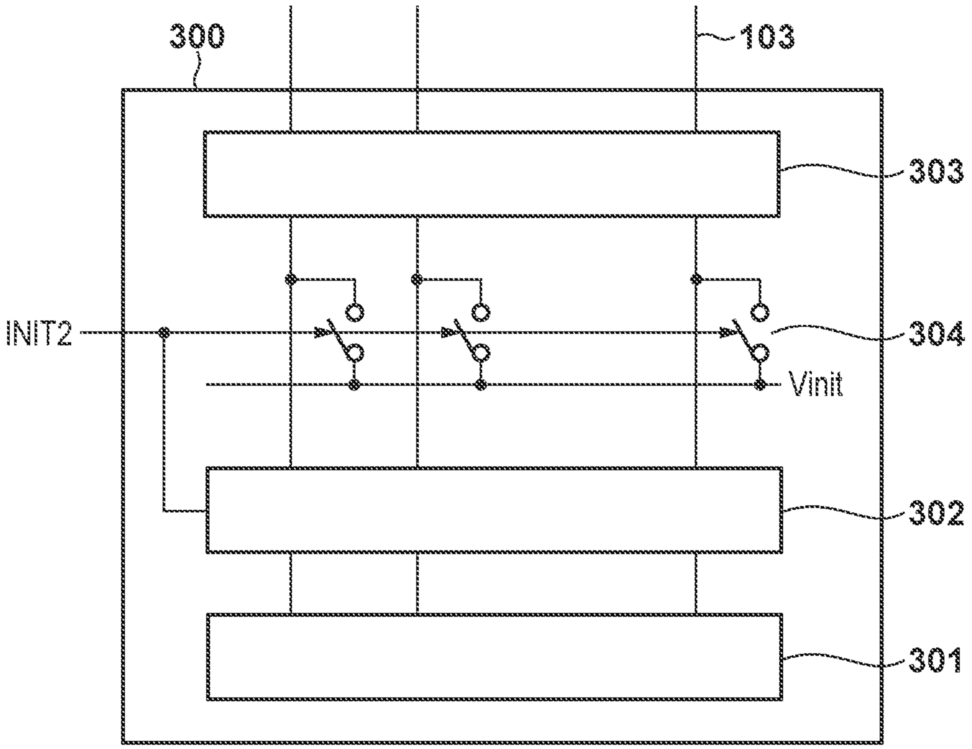
FIG. 6 is a view showing an example of the arrangement of the signal output circuit of the light emitting device shown in FIG. 1.

FIG. 6 is a view showing a modification of the signal output circuit 300 shown in FIG. 4. The connection position of the switch 304 is different from that in the arrangement shown in FIG. 4. In the signal output circuit 300 shown in FIG. 6, the potential Vinit is supplied to the input node of the driver circuit 303 of the signal output circuit 300 via the switch 304. It can also be said that the switch 304 is connected to the node connecting the DAC circuit 302 and the driver circuit 303.

The switch 304 is controlled to be turned on or off by the control signal INIT2 output from the control circuit 400. The control signal INIT2 supplied from the control circuit 400 also controls the output state of the DAC circuit 302. When the control signal INIT2 is at HI level, the switch 304 is set in the OFF state and the digital-analog conversion function of the DAC circuit 302 is enabled. Accordingly, the luminance signal corresponding to the image signal is supplied to the signal line 103 via the driver circuit 303. On the other hand, when the control signal INIT2 is at LO level, the switch 304 is set in the ON state and the DAC circuit 302 performs a high impedance output. Accordingly, the potential Vinit is supplied to the signal line 103 via the driver circuit 303.

Even in a case in which the signal output circuit 300 has the arrangement shown in FIG. 6, the light emitting device 100 operates as in the above description. Hence, an effect similar to that of the light emitting device 100 described above can be obtained.

Figure 7:
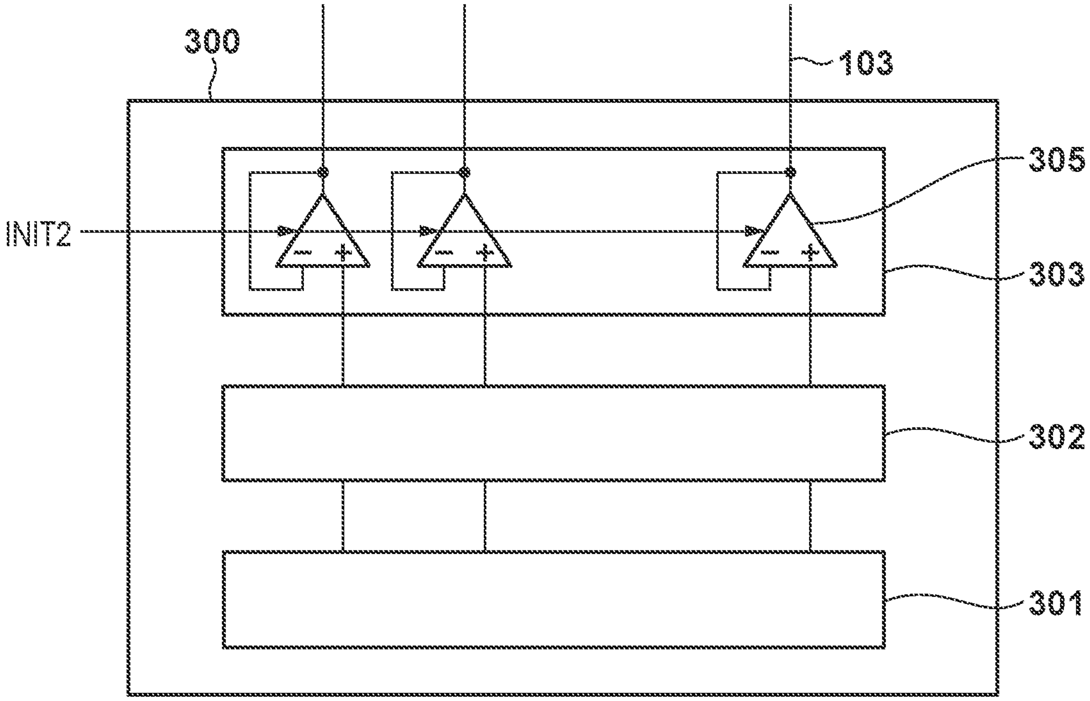
FIG. 7 is a view showing an example of the arrangement of the signal output circuit of the light emitting device shown in FIG. 1.

FIG. 7 is a view showing a modification of the signal output circuit 300 shown in each of FIGS. 4 and 6. The signal output circuit 300 shown in FIG. 7 does not include the switch 304. The arrangement different from that of the signal output circuit 300 shown in each of FIGS. 4 and 6 will be mainly described below. A description of the arrangement of the signal output circuit 300 shown in FIG. 7 that may be similar to the arrangement of the signal output circuit 300 shown in each of FIGS. 4 and 6 will be omitted, as appropriate.

The driver circuit 303 shown in FIG. 7 includes an operational amplifier 305 so as to correspond to the signal line 103 arranged for each column. The output of the DAC circuit 302 is connected to the noninverting input terminal of the operational amplifier 305 for each column. The inverting input terminal of the operational amplifier 305 is connected to the output terminal of the operational amplifier 305. The inverting input terminal and output terminal of the operational amplifier 305 are further connected to the signal line 103. With this arrangement, the operational amplifier 305 forms a voltage follower in which the input terminal is connected to the output of the DAC circuit 302 and the output terminal is connected to the signal line 103. Accordingly, the luminance signal output from the DAC circuit 302 is buffered by the operational amplifier 305, and output to the signal line 103. The output state of the operational amplifier 305 is controlled by the control signal INIT2 supplied from the control circuit 400.

Figure 8:
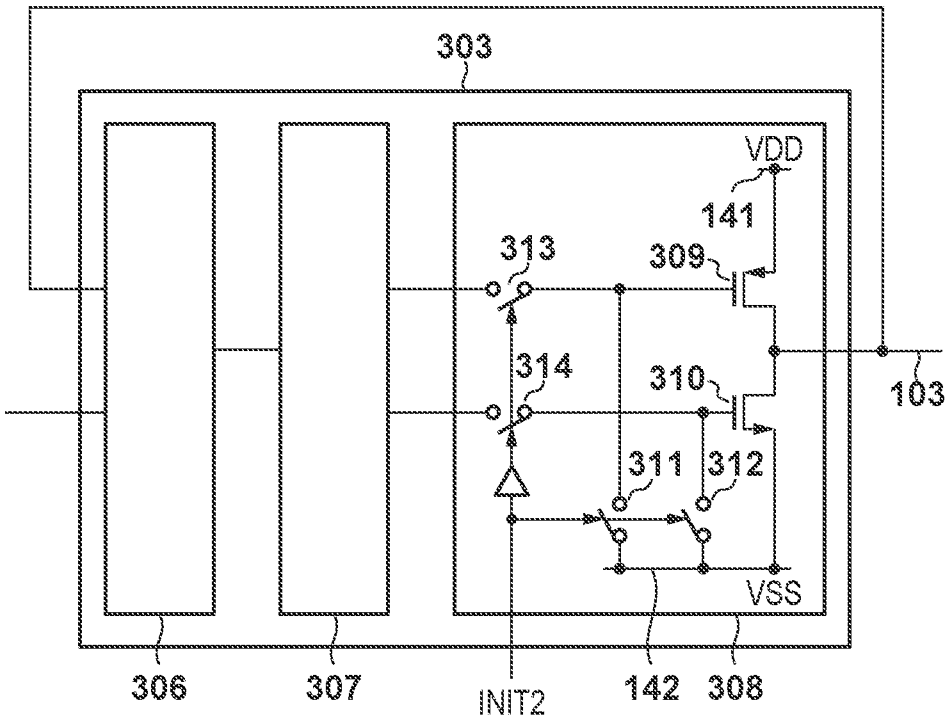
FIG. 8 is a view showing an example of the arrangement of a driver circuit of the signal output circuit shown in FIG. 7.

FIG. 8 is a view showing a specific arrangement example of the operational amplifier 305. Similar to a general operational amplifier, the operational amplifier 305 can include an input stage 306, a gain stage 307, and an output stage 308. The input stage 306 amplifies the input differential signal. The gain stage 307 further amplifies the output of the input stage 306. The output stage 308 buffers the output of the gain stage 307.

The output stage 308 can include a p-type transistor 309, an n-type transistor 310, and switches 311 to 314. The drain of the transistor 309 and the drain of the transistor 310 are connected to each other, and connected to the signal line 103 as the output terminal of the output stage 308. The source of the transistor 309 is connected to the power supply line 141 that supplies the potential VDD. The source of the transistor 310 is connected to the power supply line 142. In this embodiment, the power supply line connected to the source of the transistor 310 supplies the potential VSS. However, the present invention is not limited to this, and the power supply line connected to the source of the transistor 310 may supply a potential different from the potential VSS. With this arrangement, the transistor 309 and the transistor 310 form a source-grounded push-pull circuit. The output of the gain stage 307 is input to the gate of the transistor 309 and the gate of the transistor 310 via the switch 313 and the switch 314, respectively. The gate of the transistor 309 is connected to the power supply line 142, which supplies the potential VSS, via the switch 311. On the other hand, the gate of the transistor 310 is connected to the power supply line 142, which supplies the potential VSS, via the switch 312.

The switches 311 to 314 are controlled by the control signal INIT2 supplied from the control circuit 400. When the control signal INIT2 is in HI level, the switch 311 and the switch 312 are set in the OFF state, and the switch 313 and the switch 314 are set in the ON state. Accordingly, the output stage 308 buffers the signal output from the gain stage 307. On the other hand, when the control signal INIT2 is in LO level, the switch 311 and the switch 312 are set in the ON state, and the switch 313 and the switch 314 are set in the OFF state. Accordingly, the potential VSS is supplied to the gate of the transistor 309, thereby setting the transistor 309 in the ON state. The potential VSS is also supplied to the gate of the transistor 310, thereby setting the transistor 310 in the OFF state. Therefore, the potential VDD is output to the signal line 103.

In this manner, the driver circuit 303 is configured to be capable of selectively outputting the luminance signal supplied from the DAC circuit 302 and the potential VDD serving as the potential Vinit as described above. The luminance signal and the potential VDD are switched in accordance with the control signal INIT2 supplied from the control circuit 400 as in the above description. That is, even in a case in which the signal output circuit 300 has the arrangement shown in each of FIGS. 7 and 8, the light emitting device 100 operates as in the above description. Hence, an effect similar to that of the light emitting device 100 described above can be obtained.

Figure 9:
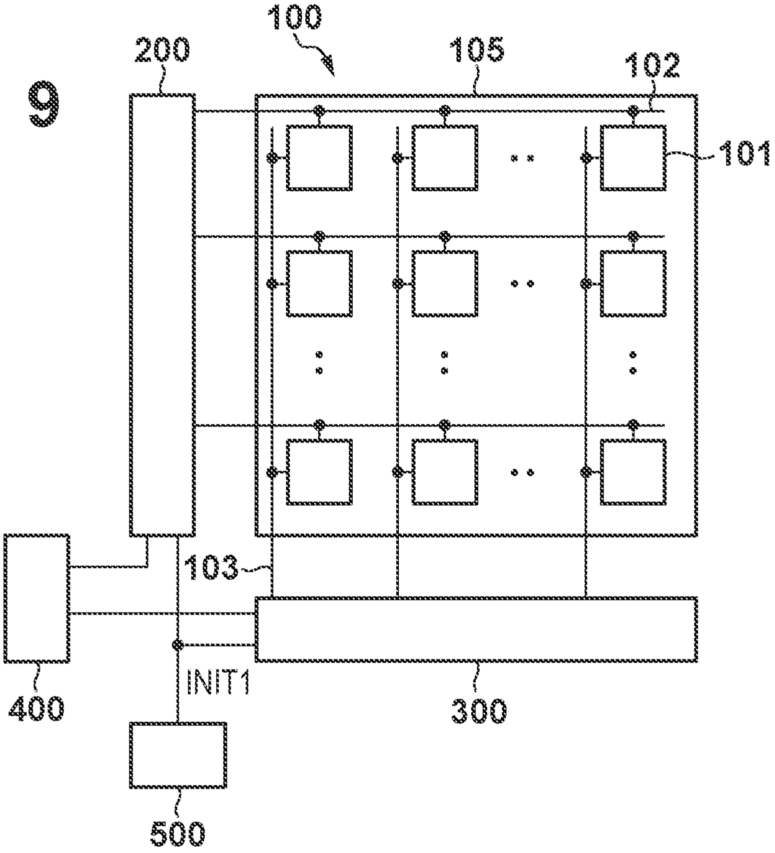
FIG. 9 is a view showing a modification of the light emitting device shown in FIG. 1.

FIG. 9 is a view showing a modification of the light emitting device 100 shown in FIG. 1. As compared to the arrangement shown in FIG. 1, the light emitting device 100 shown in FIG. 9 further includes a detection circuit 500 that detects the potential of the power supply line 141. The arrangement different from that of the light emitting device 100 shown in FIG. 1 will be mainly described below, and a description of the arrangement that may be similar to the arrangement shown in FIG. 1 will be omitted, as appropriate.

The detection circuit 500 has a function of detecting the rise of the potential of the power supply line 141 which supplies the potential VDD. Further, the detection circuit 500 outputs, to the driving circuit 200 and the signal output circuit 300, the detection result of the potential of the power supply line 141 as the control signal INIT1. More specifically, when the potential of the power supply line 141 is lower than a predetermined potential Vdtct after the activation of the light emitting device 100, the detection circuit 500 supplies LO level as the control signal INIT1. On the other hand, when the detection circuit 500 detects that the potential of the power supply line 141 has reached the predetermined potential Vdtct, it supplies HI level as the control signal INIT1.

Figure 10:
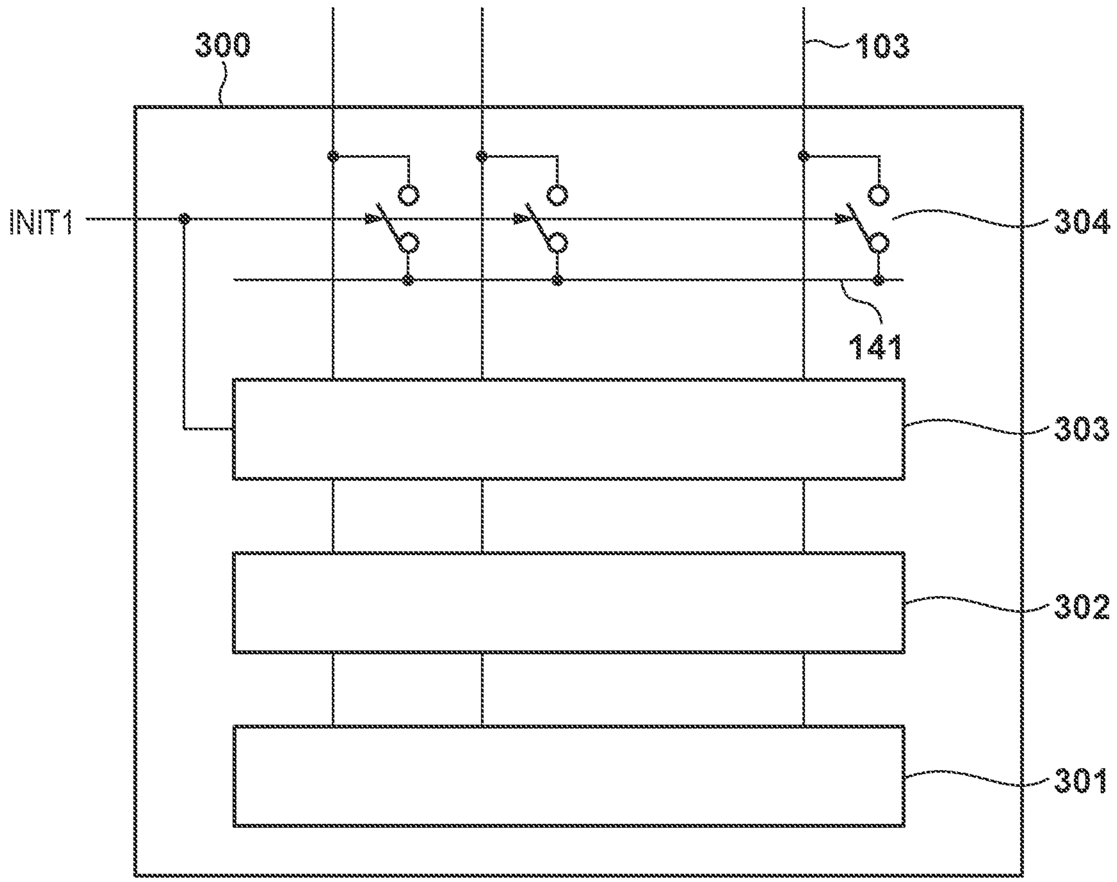
FIG. 10 is a view showing an example of the arrangement of a signal output circuit of the light emitting device shown in FIG. 9.

FIG. 10 is a view showing an example of the arrangement of the signal output circuit 300 arranged in the light emitting device 100 shown in FIG. 9. In place of the control signal INIT2 described above, the control signal INIT1 is input to the signal output circuit 300. Accordingly, the switch 304 is controlled to be turned on or off by the control signal INIT1. Further, the power supply line 141 is connected to the output node of the signal output circuit 300 via the switch 304.

Figure 11:
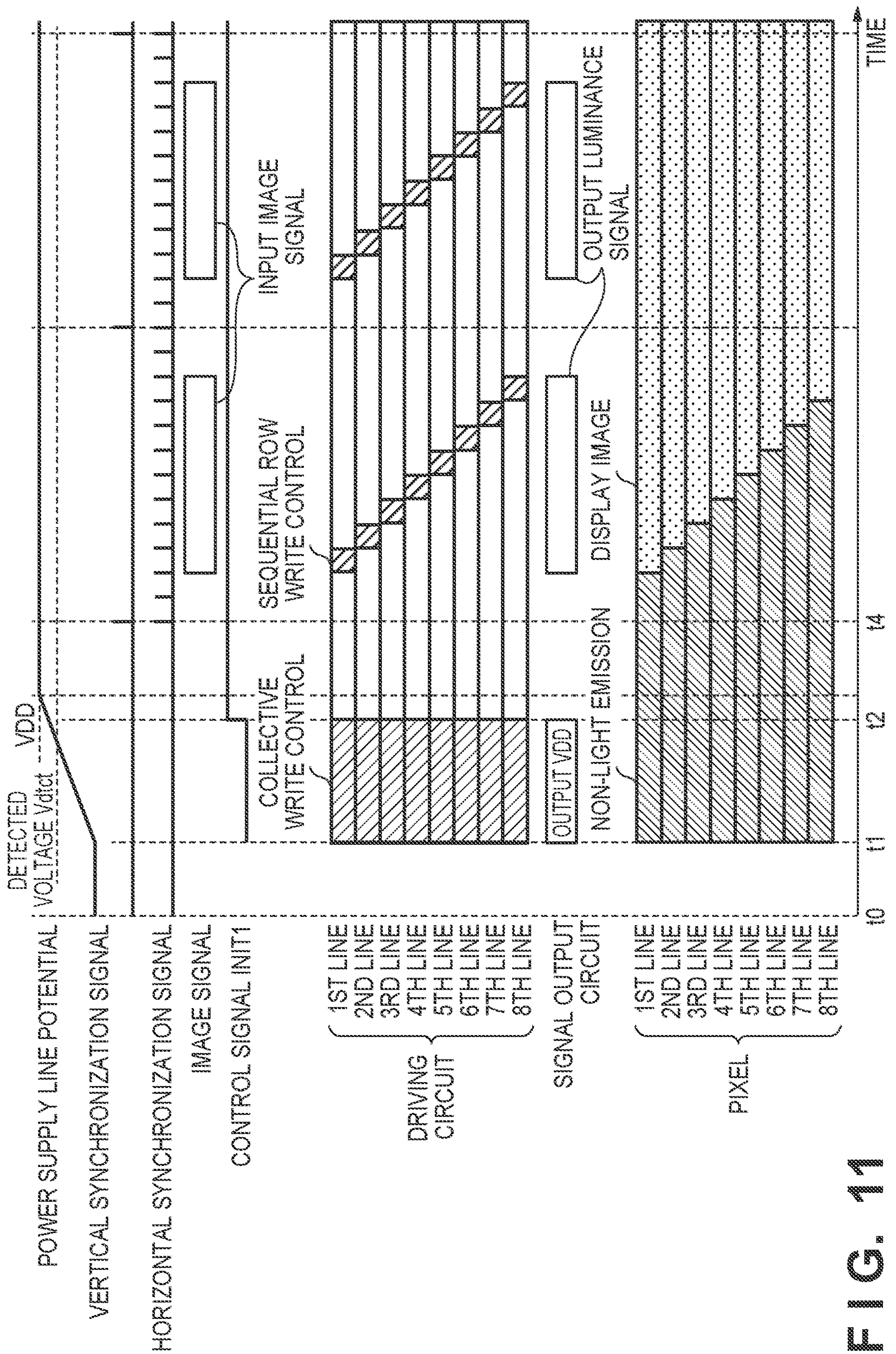
FIG. 11 is a timing chart showing an example of the operation of the light emitting device shown in FIG. 9.

FIG. 11 is a timing chart showing an example of the operation of the light emitting device 100 including the detection circuit 500 shown in FIG. 9. Similar to the timing chart shown in FIG. 5, the number of rows of the pixels 101 arranged in the pixel array 105 is illustrated as eight.

At time t1, when the light emitting device 100 is activated, and the potential of the power supply line 141 starts to rise toward the potential VDD, the detection circuit 500 sets the control signal INIT1 in LO level. When LO level is supplied as the control signal INIT1, as in the above description, the driving circuit 200 starts a signal write operation of writing the signal (potential) supplied to the signal line 103 in the gate of the driving transistor 120. Therefore, the potential of the power supply line 141 is input to the gates of the driving transistors 120 of all the pixels 101. After time t1, the power supply line 141 continues to change in accordance with the rise of the power supply. Accordingly, the signal (potential) input to the gate of the driving transistor 120 also changes in accordance with the potential of the power supply line 141.

At time t2, when the potential of the power supply line 141 has reached the predetermined potential Vdtct, the detection circuit 500 sets the control signal INIT1 in HI level in accordance with detecting that the potential has reached the predetermined potential Vdtct. At this time, the potential Vdtct is written in the gate of the driving transistor 120 of the pixel 101, and writing is completed. Even after time t2, the potential of the power supply line 141 continues to rise until it reaches the potential VDD. At time t4 at which the potential of the power supply line 141 is stable at the potential VDD, a vertical synchronization signal and a horizontal synchronization signal are generated by the control circuit 400, and image display is started as in the operation after time t4 shown in FIG. 5.

In this manner, the driving circuit 200 performs a signal write operation of writing the non-light emission potential in the gate of the driving transistor 120 of the pixel 101 during a period until the detection circuit 500 detects that the potential of the power supply line 141 has reached the predetermined potential Vdtct after the activation of the light emitting device 100. Further, the driving circuit 200 ends the signal write operation in accordance with the detection circuit 500 detecting that the potential of the power supply line 141 has reached the predetermined potential Vdtct. As a result, the potential of the signal written in the gate of the driving transistor 120 becomes the same potential as the potential Vdtct detected by the detection circuit 500.

Here, pay attention to the period from time t1, at which the potential of the power supply line 141 starts to rise up to the potential VDD, to the start of image display. During the period from time t1 to time t2, the potential of the power supply line 141 is input to the gate of the driving transistor 120, which is also input to the source of the driving transistor 120. Accordingly, the pixel 101 is set in the non-light emission state. On the other hand, after time t2, even after the potential Vdtct is written in the gate of the driving transistor 120 of the pixel 101 at time t2, the potential of the power supply line 141 changes. Accordingly, a potential difference (voltage) is generated between the drain and source of the driving transistor 120. Therefore, in this embodiment, the potential Vdtct detected by the detection circuit 500 is set to the non-light emission potential described above. With this, even if the potential of the power supply line 141 changes up to the potential VDD after time t2, only a potential difference that sets the pixel 101 in the non-light emission state (alternatively, a visually unrecognizable level or a level without the sense of incongruity even if light is emitted) is generated between the drain and source of the driving transistor 120. Thus, during the period from the activation to the start of image display, all the image pixels 101 can be maintained in the non-light emission state.

As has been described above, as in the arrangement shown in FIGS. 9 to 11, the signal output by the detection circuit 500 detecting the potential of the power supply line 141 is used as the control signals INIT1 and INIT 2. With this, an effect as in the above-described embodiment can be obtained. The potential VDD is supplied to the output node of the signal output circuit 300 shown in FIG. 10 via the switch 304, but the present invention is not limited to this. For example, one of the arrangements shown in FIGS. 6 to 8 may be used as the signal output circuit 300. Also in the embodiment to be described below, the arrangement of the signal output circuit 300 and the like can combined and used, as appropriate.

Figure 12:
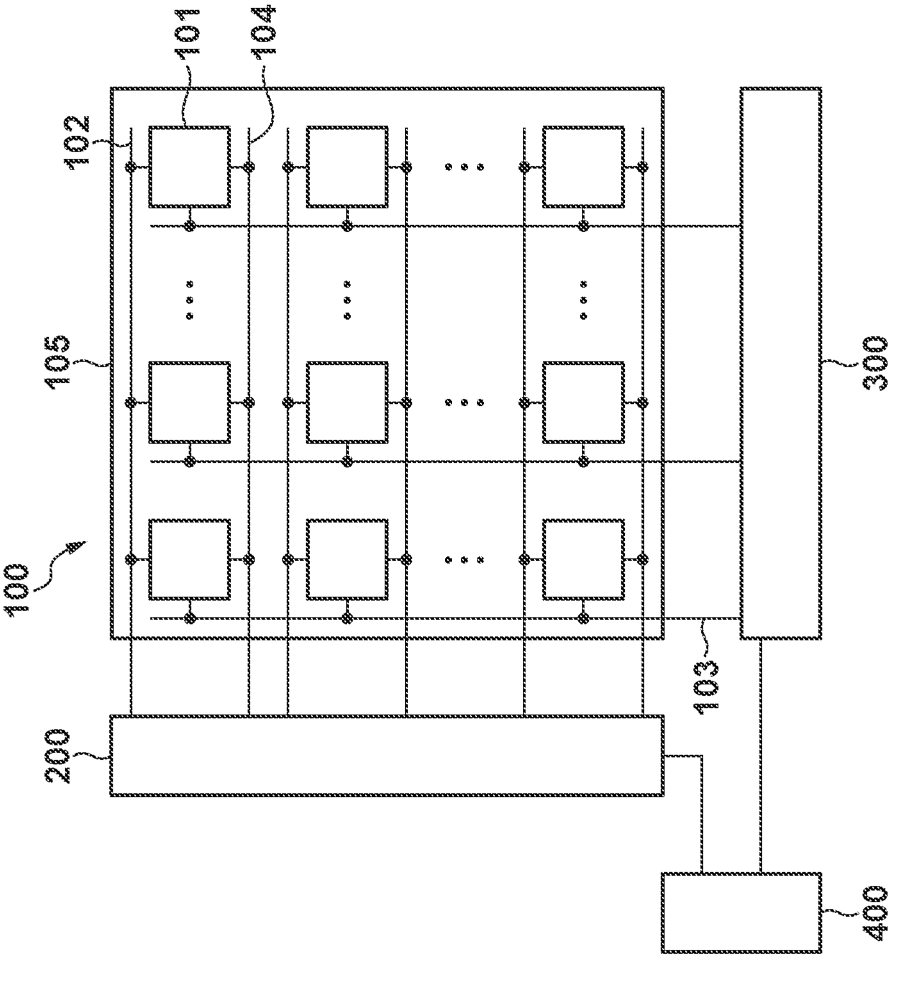
FIG. 12 is a view showing a modification of the light emitting device shown in FIG. 1.

FIG. 12 is a view showing a modification of the light emitting device 100 shown in FIG. 1. As compared to the arrangement shown in FIG. 1, the light emitting device 100 shown in FIG. 12 further includes a scanning line 104. The arrangement different from that of the light emitting device 100 shown in FIG. 1 will be mainly described below, and a description of the arrangement that may be similar to the arrangement shown in FIG. 1 will be omitted, as appropriate.

Each pixel 101 is connected to the driving circuit 200 via the scanning line 102 and the scanning line 104 each commonly arranged for each row. The driving circuit 200 is controlled by the control circuit 400 to select, from the pixel array 105, not only the row to write the luminance signal but also the row (to be sometimes referred to as the light emitting row hereinafter) to emit light with the luminance corresponding to the written luminance signal.

Figure 13:
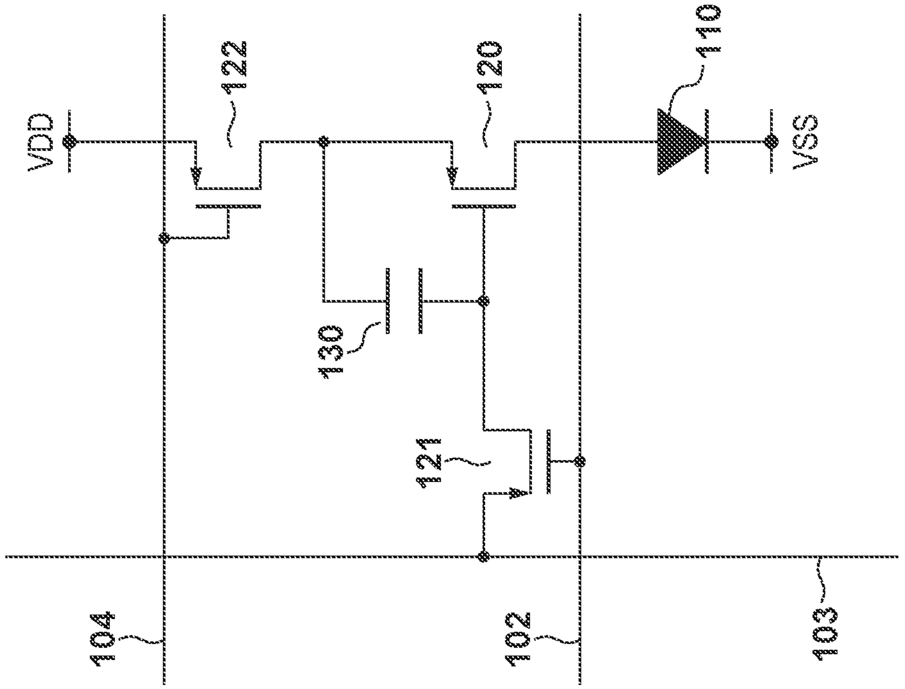
FIG. 13 is a view showing an example of the arrangement of a pixel of the light emitting device shown in FIG. 12.

FIG. 13 is a view showing an example of the arrangement of the pixel 101 arranged in the light emitting device 100 shown in FIG. 12. As compared to the arrangement shown in FIG. 2, the pixel 101 shown in FIG. 13 further includes a light emission control transistor 122 which is arranged in the current path including the light emitting element 110 and the driving transistor 120, and used to control light emission of the light emitting element 110. In this embodiment, the light emission control transistor 122 is arranged between the power supply line 141 that supplies the potential VDD and the node connecting the source of the driving transistor 120 and one terminal of the capacitive element 130. The gate of the light emission control transistor 122 is connected to the scanning line 104, and the light emission control transistor 122 is controlled to be turned on or off by the driving circuit 200.

Figure 14:
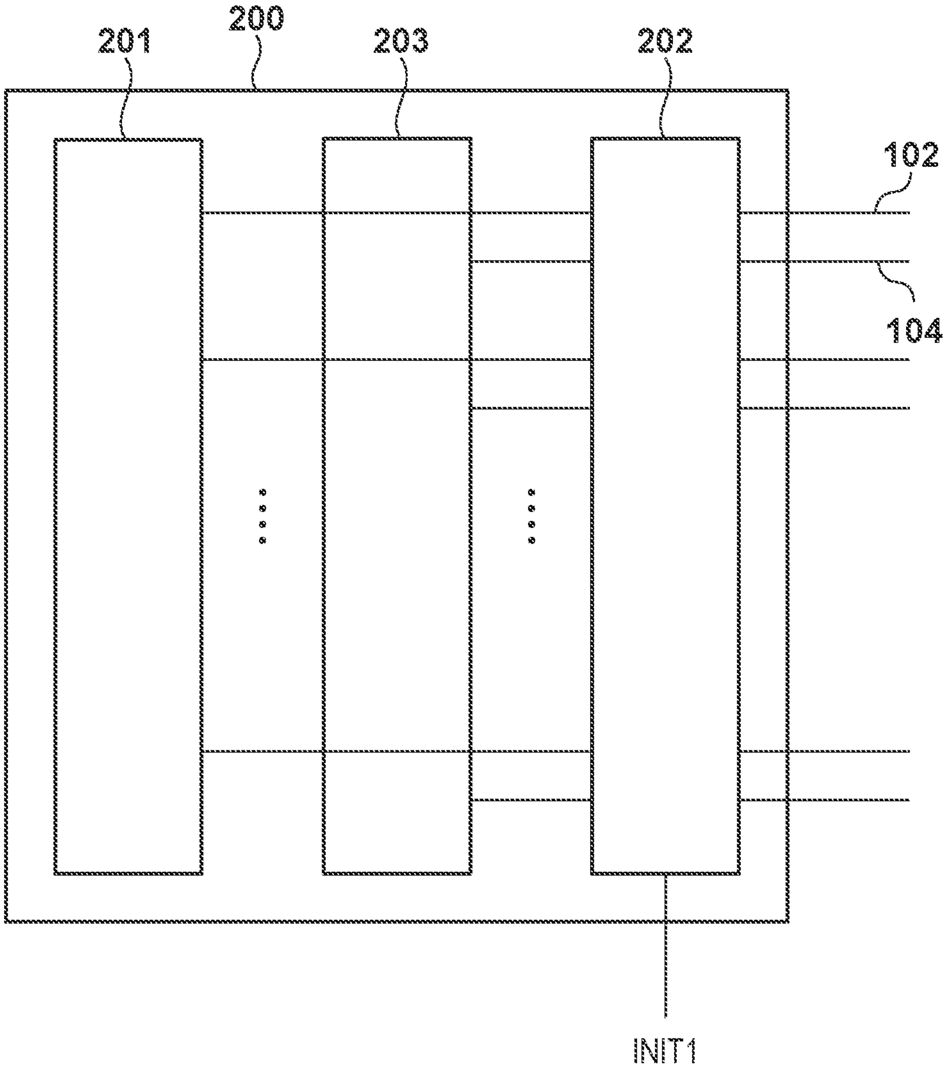
FIG. 14 is a view showing an example of the arrangement of a driving circuit of the light emitting device shown in FIG. 12.

FIG. 14 is a view showing an example of the arrangement of the driving circuit 200 arranged in the light emitting device 100 shown in FIG. 12. As compared to the arrangement shown in FIG. 3, the driving circuit 200 shown in FIG. 14 includes a light emission scanning circuit 203. The light emission scanning circuit 203 is provided with an output for each row, and sequentially selects the row as the light emitting row. The write circuit 202 of the driving circuit 200 controls, via the scanning lines 102 and 104, luminance signal writing and light emission of the pixel 101 based on the output of the scanning circuit 201, the output of the light emission scanning circuit 203, and the control signal INIT1 supplied from the control circuit 400. When the control signal INIT1 is in HI level, as in the above description, the write circuit 202 of the driving circuit 200 controls write scanning in which the scanning circuit 201 selects multiple pixels 101 arranged in the pixel array 105 on a row basis and sequentially writes the luminance signal in the gate of the driving transistor 120 for each row. Simultaneously, the write circuit 202 of the driving circuit 200 performs light emission control in which the light emission scanning circuit 203 selects multiple pixels 101 arranged in the pixel array 105 on a row basis and turns on the light emission control transistor 122 of the pixel in the selected row, thereby selectively causing the light emitting element 110 to emit light. On the other hand, when the control signal INIT1 is in LO level, as in the above description, the write circuit 202 of the driving circuit 200 performs a signal write operation of collectively writing a predetermined signal (for example, the potential Vinit) in all pixels of the plurality of pixels 101 arranged in the pixel array 105.

Next, the operation of the light emitting device 100 in image display according to this embodiment will be described. In the pixel 101 not selected as either the write row or the light emitting row, both the write transistor 121 and the light emission control transistor 122 are in the OFF state. From this state, the driving circuit 200 sequentially performs write control of the pixels 101 on a row basis. When the pixel 101 is selected as the write row, a threshold correction operation and a luminance signal write operation are performed. In the threshold correction operation, first, the write transistor 121 in the write row is set in the ON state. As this time, a reference signal independent of the luminance signal is output from the signal output circuit 300 to the signal line 103, and the reference signal is input to the gate of the driving transistor 120 in the write row. Then, the light emission control transistor 122 in the write row is temporarily set in the ON state. When the light emission control transistor 122 is set in the ON state, the source of the driving transistor 120 is connected to the power supply line 141. At this time, the potential difference between the gate and source of the driving transistor 120 becomes equal to or larger than a threshold value, and a current flows from the source of the driving transistor 120 via the drain thereof to the light emitting element 110. Then, when the light emission control transistor 122 is set in the OFF state, the potential of the source of the driving transistor 120 decreases over time due to the current flowing from the source to the drain. When the potential difference between the drain and the source reaches about the threshold value in accordance with the decrease of the potential of the source of the driving transistor 120, the fluctuation of the potential of the source of the driving transistor 120 converges. After the fluctuation of the potential of the source of the driving transistor 120 converges, the write transistor 121 is set in the OFF state, and the threshold voltage of the driving transistor 120 is held in the capacitive element 130. With this operation, the threshold correction operation is completed, and transitions to the luminance signal write operation. In the threshold correction operation, since a current flows to the light emitting element 110, the light emitting element 110 emits light. However, since the period of the threshold correction operation is very shorter than one frame period for displaying one image, this light emission is not a large problem.

In the luminance signal write operation, first, the signal output circuit 300 supplies the luminance signal to the signal line 103. Then, the write transistor 121 of the pixel 101 arranged in the row corresponding to the supplied luminance signal is temporarily set in the ON state. In accordance with this, the luminance signal is written in the gate of the driving transistor 120 of the pixel 101 in the corresponding row. Then, when the write transistor 121 is set in the OFF state, write control is completed, and the next row is selected as the write row.

The row where writing of the luminance signal is completed is selected as the light emitting row by the driving circuit 200 in the subsequent horizontal period, and light emission control is performed. When the row is selected as the light emitting row, the light emission control transistor 122 is set in the ON state. In accordance with this, the potential of the source of the driving transistor 120 becomes the potential VDD supplied to the power supply line 141, a current corresponding to the written luminance signal is supplied from the driving transistor 120 to the light emitting element 110, and the light emitting element 110 emits light. Then, after a predetermined horizontal period elapses, the light emission control is completed. When the light emission control is completed, the light emission control transistor 122 is set in the OFF state, and waits in the non-light emission state until write control in the next frame.

During the period of light emission control, the luminance signal with the variation in threshold value of the driving transistor 120 for each pixel 101 reduced by the threshold voltage held by the capacitive element 130 by the threshold correction operation is input to the gate of the driving transistor 120. Therefore, in the arrangement in this embodiment, the variation in light emission luminance due to the variation in threshold value of the driving transistor 120 is reduced, and an image with higher uniformity than in the above-described embodiment can be displayed in the display surface of the pixel array 105.

Figure 15:
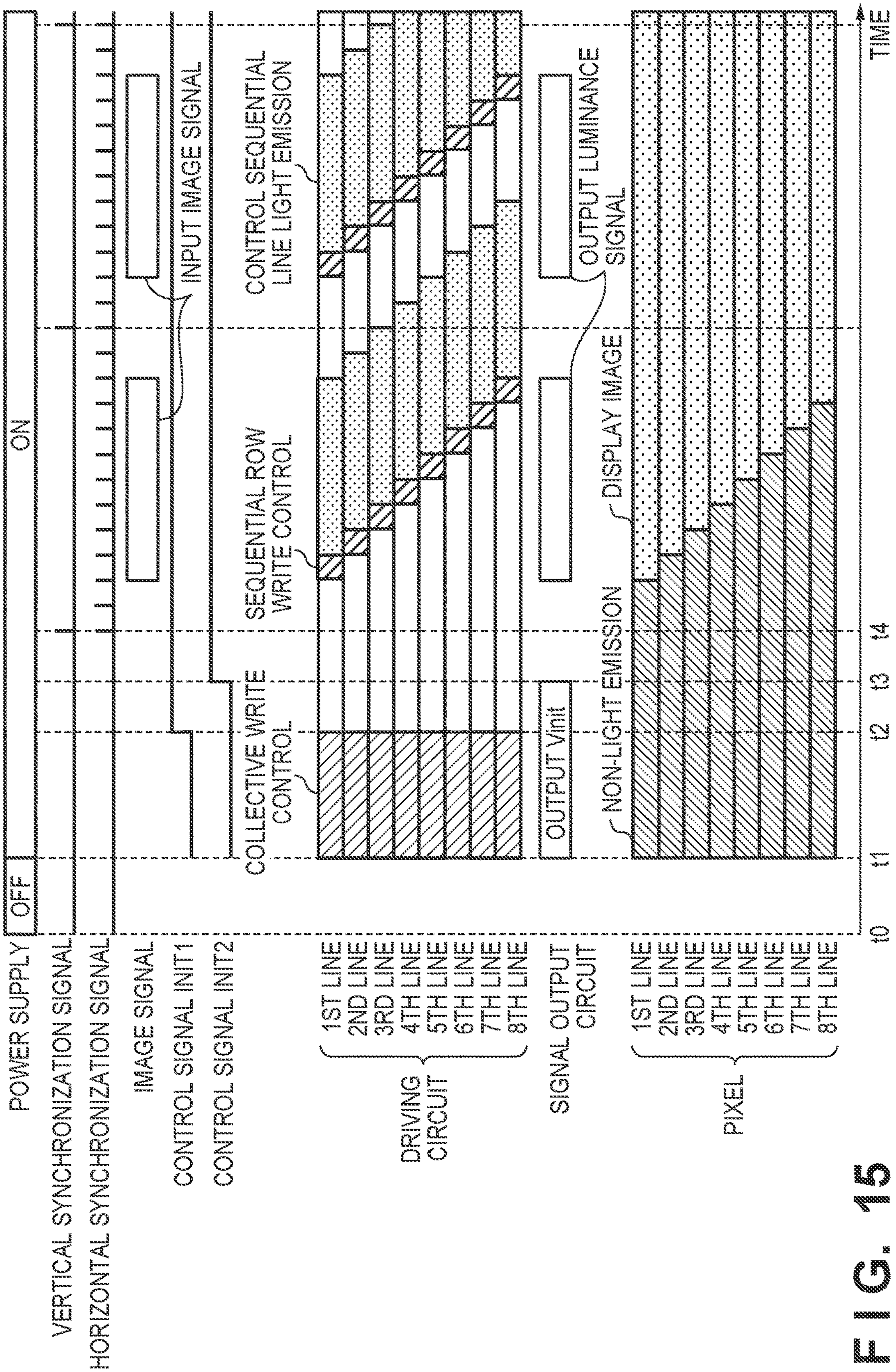
FIG. 15 is a timing chart showing an example of the operation of the light emitting device shown in FIG. 12.

Next, the operation from the activation of the light emitting device 100 to the start of image display in this embodiment will be described with reference to an operation timing chart. FIG. 15 is a timing chart showing an example of the operation of the light emitting device 100 in this embodiment. For the sake of descriptive convenience, as in FIGS. 5 and 11, the number of rows of the pixels 101 arranged in the pixel array 105 is illustrated as eight.

At time t0, the power supply of the light emitting device 100 is in the OFF state. At time t1, the light emitting device 100 is powered on. When powered on, the control circuit 400 controls both the control signal INIT1 and the control signal INIT2 to LO level. When LO level is supplied as each of the control signals INIT1 and INIT2, as in the above description, the write circuit 202 of the driving circuit 200 supplies, to all the scanning lines 102, a signal that turns on the write transistor 121, thereby turning on the write transistors 121. In addition, the switch 304 of the signal output circuit 300 (for example, the arrangement shown in FIG. 4) is set in the ON state, and the potential Vinit is supplied to the signal line 103. With this, the write circuit 202 of the driving circuit 200 collectively writes the non-light emission potential (for example, the potential Vinit) as the predetermined signal in the gates of the driving transistors 120 of all pixels of the plurality of pixels 101 arranged in the pixel array 105.

Then, at time t2 and time t3, the control signal INIT1 and the control signal INIT2 are sequentially switched to HI level, respectively. Thereafter, after time t4, the above-described write control and light emission control are sequentially performed from the first row, and image display is started.

In this manner, even in a case in which the light emission control transistor 122 is arranged in the pixel 101, as in the above description, it is possible to maintain the pixel 101 in the non-light emission state during the period from the activation of the light emitting device 100 to the start of image display. Accordingly, also in the light emitting device 100 including, in the pixel array 105, the pixel 101 including the light emission control transistor 122, an effect similar to that in the above description can be obtained. Here, during the period from the activation of the light emitting device 100 to the start of image display, the light emission control transistor 122 may be in the ON state, or may be in the OFF state.

In the light emitting device 100 using an organic EL element, a liquid crystal element, or the like, burn-in on the display array 105 serving as the display surface may be a problem. In order to suppress the burn-in, an image is displayed in a display region formed by the pixels arranged in some rows among the plurality of pixels 101, and the position of the display region is shifted at a predetermined timing. Next, the light emitting device 100 including the pixel 101 that includes the above-described light emission control transistor 122, and has a function of shifting the display region in the row direction during image display will be described.

Figure 16:
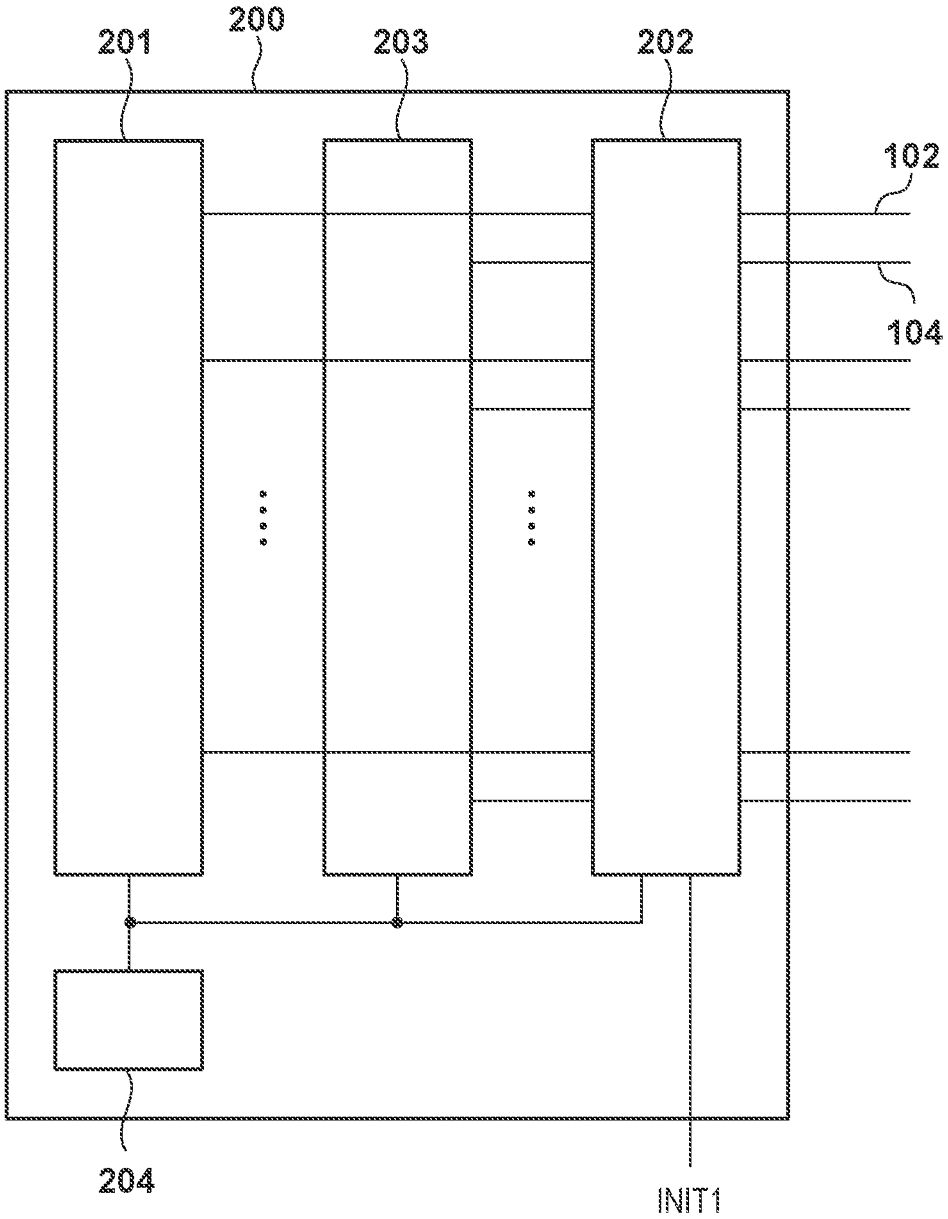
FIG. 16 is a view showing an example of the arrangement of the driving circuit of the light emitting device shown in FIG. 1.

FIG. 16 is a view showing an example of the arrangement of the driving circuit 200 that shifts the display region. As compared to the arrangement shown in FIG. 14, the driving circuit 200 shown in FIG. 16 further includes a display row designation circuit 204 that designates the row to display an image. The scanning circuit 201 sequentially selects the row as the write row from the display rows designated by the display row designation circuit 204. Similarly, the light emission scanning circuit 203 sequentially selects the row as the light emitting row from the display rows designated by the display row designation circuit 204. Here, in this embodiment, each of the scanning circuit 201 and the light emission scanning circuit 203 can be configured to include a shift register. By arranging the display row designation circuit 204, the driving circuit 200 is configured to be capable of displaying an image in the display region formed by the pixels arranged in some rows among the plurality of pixels 101. Further, the driving circuit 200 can shift the position of the display region at a predetermined timing. Here, the predetermined timing for shifting the position of the display region may be the timing for switching the image between frames. Alternatively, for example, the predetermined timing for shifting the position of the display region may be the timing after an elapse of an appropriate time measured by a timer or the like incorporated in the light emitting device 100. Alternatively, the predetermined timing may be the timing at which a signal for shifting the position of the display region is input from the outside of the light emitting device 100.

As in the above description, the output of the scanning circuit 201 and the output of the light emission scanning circuit 203 are input to the write circuit 202. The write circuit 202 of the driving circuit 200 controls, via the scanning lines 102 and 104, luminance signal writing and light emission of the pixel 101 based on the output of the scanning circuit 201, the output of the light emission scanning circuit 203, the control signal INIT1 supplied from the control circuit 400, and the output of the display row designation circuit 204. When the control signal INIT1 is in HI level, the write circuit 202 of the driving circuit 200 controls write scanning in which the scanning circuit 201 selects multiple pixels 101 arranged in the pixel array 105 on a row basis and sequentially writes the luminance signal in the gate of the driving transistor 120 for each row. Simultaneously, the write circuit 202 of the driving circuit 200 performs light emission control in which the light emission scanning circuit 203 scans, on a row basis, the pixels arranged in the rows in the display region among the plurality of pixels 101 arranged in the pixel array 105, and turns on the light emission control transistor 122 of the pixel in the row included in the display region among the plurality of pixels 101, thereby sequentially causing the light emitting element 110 to emit light. At this time, based on the output of the display row designation circuit 204, the write circuit 202 of the driving circuit 200 performs non-light emission control of controlling the pixel 101 arranged in the row not included in the display region among the plurality of pixels 101 to the non-light emission state. Here, non-light emission control is setting the light emission control transistor 122 in the OFF state via the scanning line 104. On the other hand, when the control signal INIT1 is in LO level, as in the above description, a signal write operation is performed in which a predetermined signal (for example, the potential Vinit) is collectively written in all pixels of the plurality of pixels 101 arranged in the pixel array 105.

Figure 17:
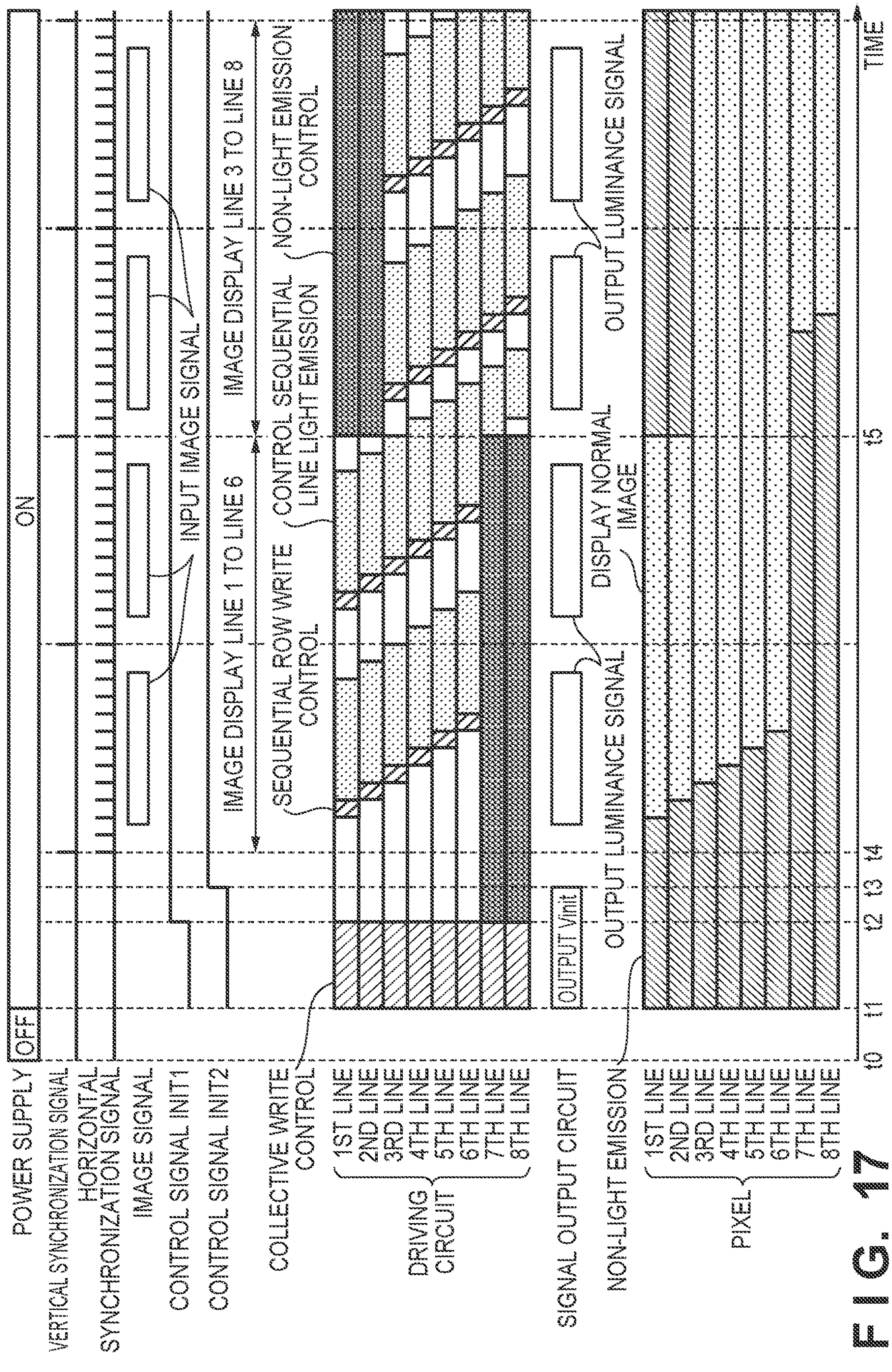
FIG. 17 is a timing chart showing an example of the operation of the light emitting device including the driving circuit shown in FIG. 16.

FIG. 17 is a timing chart showing an example of the operation of the light emitting device 100 in this embodiment. For the sake of descriptive convenience, as in FIGS. 5, 11, and 15, the number of rows of the pixels 101 arranged in the pixel array 105 is illustrated as eight. Further, the number of rows in the display region to display an image is illustrated as six.

During the period from time t0 to time t4, the light emitting device 100 performs the operation as in FIG. 15 described above. Then, after a predetermined blanking period elapses from time t4, image display is started. Here, assume that in the frame period starting from time t4, the first to sixth rows are designated as the rows in the display region to display an image. In this case, the display row designation circuit 204 designates the first to sixth rows, and the driving circuit 200 sequentially performs write control and light emission control from the first row to the sixth row. On the other hand, the driving circuit 200 performs the non-light emission control described above from the seventh row to the eighth row which are outside the display region.

In this manner, even in a case in which the light emitting device 100 (driving circuit 200) has a function of shifting the position of the display region, as in the above description, it is possible to maintain the pixel 101 in the non-light emission state during the period from the activation of the light emitting device 100 to the start of image display. Accordingly, also in the light emitting device 100 having the function of shifting the position of the display region, an effect similar to that in the above description can be obtained.

Further, in this embodiment, an additional effect described below can be obtained. As has been described above, after the predetermined blanking period elapses from time t4, image display is started while setting the first to sixth rows as the display region. In each display frame, the driving circuit 200 sequentially performs write control and light emission control of the pixels 101 from the first row to the sixth row. Then, assume that the display region is changed to the third to eighth rows in synchronization with the vertical synchronization signal at time t5. At this time, the driving circuit 200 performs non-light emission control of the first and second rows, and releases the non-light emission control of the seventh and eighth rows at the same time. In accordance with this, as shown in FIG. 17, in a case in which the light emission control is performed with respect to the sixth row as the last display row in the last horizontal period in the frame immediately before the display region is switched, the driving circuit 200 continuously scans the seventh row in the next frame by the internal shift register. Therefore, the pixel 101 switched from the display region to the non-display region undergoes light emission control before a predetermined luminance signal is input.

Here, assume that, as described in Japanese Patent Laid-Open No. 2007-114476, at the time of activation of the light emitting device 100, normal scanning is performed with respect to the pixel 101 arranged in the row in the display region in the pixel array 105, and a black level signal is written in the pixel 101. In this case, the black level signal is written in only six rows of eight rows in total arranged in the pixel array 105. Accordingly, in two rows where scanning is not performed, the potential of the gate of the driving transistor 120 becomes unstable. Hence, in accordance with the change of the display position, light may be emitted due to the first light emission control from time t5. To the contrary, in the light emitting device 100 according to this embodiment, it is possible to collectively write the non-light emission potential in the gates of the driving transistors 120 of all the pixels 101 arranged in the pixel array 105, regardless of the display region. Therefore, in the light emitting device 100 having the function of shifting the position of the display region, it is possible to suppress light emission caused by changing the display region. That is, the display quality in the light emitting device 100 further improves.

Here, in each embodiment described above, it has been described that, during the period from the activation of the light emitting device 100 to the display of an image corresponding to the luminance signal by write scanning of the scanning circuit 201, the signal write operation of writing the predetermined signal such as the non-light emission potential in the gate of the driving transistor 120 is collectively performed with respect to all pixels of the plurality of pixels 101. However, the signal write operation is not limited to be collectively performed with respect to all the pixels 101. For example, there can be a case in which an obstruction exists between the observer and the pixel array 105 serving as the display surface, so the light beams emitted by the pixels 101 in some rows do not reach the observer. In this case, the signal write operation of writing the predetermined signal such as the non-light emission potential in the gate of the driving transistor 120 may not be performed with respect to the row including the pixel, among the pixels 101, arranged in the row which is difficult for the observer to observe due to the obstruction. Even in this case, display without the sense of incongruity for the observer can be implemented.

For example, during the period from the activation of the light emitting device 100 to the start of image display, the driving circuit 200 may perform a signal write operation of writing the predetermined signal such as the non-light emission potential in the gates of the driving transistors 120 included in the pixels arranged in at least one row, or two or more rows among the plurality of pixels 101 without performing scanning using the scanning circuit 201. The row with respect to which the signal write operation is performed can be set, as appropriate, in accordance with the arrangement of the light emitting device 100, the arrangement of the observer, and the like.

Here, all pixels of the plurality of pixels 101 described above can be the pixels that are arranged in the pixel array 105 and emit light for image display. A monitor pixel that is used to correct the luminance signal or the like, a so-called dummy pixel that does not emit light in any image display, and the like, which are arranged in, for example, the outer peripheral portion of the pixel array 105, may not be included in the pixels in which a signal is collectively written during the period from the activation of the light emitting device 100 to the display of an image corresponding to the luminance signal.

Consider the additional effect in a case of performing display while shifting the position of the display region. In this case, it is more likely that light emission of the row changed from outside of the display region to inside of the display region upon shifting the image display occurs while the observer is observing the image compared to light emission due to the unstable potential of the gate of the driving transistor 120 before the first image display. That is, light emission due to the unstable potential of the gate of the driving transistor 120 upon changing the display region is likely to have a large influence on the image display quality in the light emitting device 100. Therefore, for example, consider a case in which the display region includes a display region where an image is first displayed after the activation of the light emitting device 100, and a display region where an image is displayed at a timing after image display in the first display region. In this case, the signal write operation of writing the predetermined signal such as the non-light emission potential in the gate of the driving transistor 120 may be performed while limiting to the rows not included in the display region where the image is displayed first, but included in the display region at a subsequent timing.

Here, application examples in which the light emitting device 100 according to this embodiment is applied to an image forming device, a display device, a photoelectric conversion device, an electronic apparatus, an illumination device, a moving body, and a wearable device will be described here with reference to FIGS. 18A to 26B. The description will be given assuming that, for example, an organic light emitting element such as an organic EL element is arranged as the light emitting element 110 in the pixel 101 arranged in the pixel array 105 of the light emitting device 100 as has been described above. Details of each component arranged in the pixel array 105 of the light emitting device 100 described above will be described first, and the application examples will be described after that.

Arrangement of Organic Light Emitting Element

The organic light emitting element is provided by forming an insulating layer, a first electrode, an organic compound layer, and a second electrode on a substrate. A protection layer, a color filter, a microlens, and the like may be provided on a cathode. If a color filter is provided, a planarizing layer may be provided between the protection layer and the color filter. The planarizing layer can be formed using acrylic resin or the like. The same applies to a case in which a planarizing layer is provided between the color filter and the microlens.

Substrate

Quartz, glass, a silicon wafer, a resin, a metal, or the like may be used as a substrate. Furthermore, a switching element such as a transistor, a wiring pattern, and the like may be provided on the substrate, and an insulating layer may be provided thereon. The insulating layer may be made of any material as long as a contact hole can be formed so that the wiring pattern can be formed between the first electrode and the substrate and insulation from the unconnected wiring pattern can be ensured. For example, a resin such as polyimide, silicon oxide, silicon nitride, or the like may be used for the insulating layer.

Electrode

A pair of electrodes can be used as the electrodes. The pair of electrodes can be an anode and a cathode. If an electric field is applied in the direction in which the organic light emitting element emits light, the electrode having a high potential is the anode, and the other is the cathode. It can also be said that the electrode that supplies holes to the light emitting layer is the anode and the electrode that supplies electrons is the cathode.

As the constituent material of the anode, a material having a large work function may be selected. For example, a metal such as gold, platinum, silver, copper, nickel, palladium, cobalt, selenium, vanadium, or tungsten, a mixture containing some of them, an alloy obtained by combining some of them, or a metal oxide such as tin oxide, zinc oxide, indium oxide, indium tin oxide (ITO), or zinc indium oxide can be used. Furthermore, a conductive polymer such as polyaniline, polypyrrole, or polythiophene can also be used as the constituent material of the anode.

One of these electrode materials may be used singly, or two or more of them may be used in combination. The anode may be formed by a single layer or a plurality of layers.

If the electrode is used as a reflective electrode, for example, chromium, aluminum, silver, titanium, tungsten, molybdenum, an alloy thereof, a stacked layer thereof, or the like can be used. The above materials can function as a reflective film having no role as an electrode. If a transparent electrode is used as the electrode, an oxide transparent conductive layer made of indium tin oxide (ITO), indium zinc oxide, or the like can be used, but the present invention is not limited thereto. A photolithography technique can be used to form the electrode.

On the other hand, as the constituent material of the cathode, a material having a small work function may be selected. Examples of the material include an alkali metal such as lithium, an alkaline earth metal such as calcium, a metal such as aluminum, titanium, manganese, silver, lead, or chromium, and a mixture containing some of them. Alternatively, an alloy obtained by combining these metals can also be used. For example, a magnesium-silver alloy, an aluminum-lithium alloy, an aluminum-magnesium alloy, a silver-copper alloy, a zinc-silver alloy, or the like can be used. A metal oxide such as indium tin oxide (ITO) can also be used. One of these electrode materials may be used singly, or two or more of them may be used in combination. The cathode may have a single-layer structure or a multilayer structure. Silver may be used as the cathode. To suppress aggregation of silver, a silver alloy may be used. The ratio of the alloy is not limited as long as aggregation of silver can be suppressed. For example, the ratio between silver and another metal may be 1:1, 3:1, or the like.

The cathode may be a top emission element using an oxide conductive layer made of ITO or the like, or may be a bottom emission element using a reflective electrode made of aluminum (Al) or the like, and is not particularly limited. The method of forming the cathode is not particularly limited, but if direct current sputtering or alternating current sputtering is used, the good coverage is achieved for the film to be formed, and the resistance of the cathode can be lowered.

Pixel Separation Layer

A pixel separation layer may be formed by a so-called silicon oxide, such as silicon nitride (SiN), silicon oxynitride (SiON), or silicon oxide (SiO), formed using a Chemical Vapor Deposition (CVD) method. To increase the resistance in the in-plane direction of the organic compound layer, the organic compound layer, especially the hole transport layer may be thinly deposited on the side wall of the pixel separation layer. More specifically, the organic compound layer can be deposited so as to have a thin film thickness on the side wall by increasing the taper angle of the side wall of the pixel separation layer or the film thickness of the pixel separation layer to increase vignetting during vapor deposition.

On the other hand, the taper angle of the side wall of the pixel separation layer or the film thickness of the pixel separation layer can be adjusted to the extent that no space is formed in the protection layer formed on the pixel separation layer. Since no space is formed in the protection layer, it is possible to reduce generation of defects in the protection layer. Since generation of detects in the protection layer is reduced, a decrease in reliability caused by generation of a dark spot or occurrence of a conductive failure of the second electrode can be reduced.

According to this embodiment, even if the taper angle of the side wall of the pixel separation layer is not acute, it is possible to effectively suppress leakage of charges to an adjacent pixel. As a result of this consideration, it has been found that the taper angle of 60° (inclusive) to 90° (inclusive) can sufficiently reduce the occurrence of defects. The film thickness of the pixel separation layer may be 10 nm (inclusive) to 150 nm (inclusive). A similar effect can be obtained in an arrangement including only pixel electrodes without the pixel separation layer. However, in this case, the film thickness of the pixel electrode is set to be equal to or smaller than half the film thickness of the organic layer or the end portion of the pixel electrode is formed to have a forward tapered shape of less than 60°. With this, short circuit of the organic light emitting element can be reduced.

Furthermore, in a case where the first electrode is the cathode and the second electrode is the anode, a high color gamut and low-voltage driving can be achieved by forming the electron transport material and charge transport layer and forming the light emitting layer on the charge transport layer.

Organic Compound Layer

The organic compound layer may be formed by a single layer or a plurality of layers. If the organic compound layer includes a plurality of layers, the layers can be called a hole injection layer, a hole transport layer, an electron blocking layer, a light emitting layer, a hole blocking layer, an electron transport layer, and an electron injection layer in accordance with the functions of the layers. The organic compound layer is mainly formed from an organic compound but may contain inorganic atoms and an inorganic compound. For example, the organic compound layer may contain copper, lithium, magnesium, aluminum, iridium, platinum, molybdenum, zinc, or the like. The organic compound layer may be arranged between the first and second electrodes, and may be arranged in contact with the first and second electrodes.

Protection Layer

A protection layer may be provided on the cathode. For example, by adhering glass provided with a moisture absorbing agent on the cathode, permeation of water or the like into the organic compound layer can be suppressed and occurrence of display defects can be suppressed. Furthermore, as another embodiment, a passivation layer made of silicon nitride or the like may be provided on the cathode to suppress permeation of water or the like into the organic compound layer. For example, the protection layer can be formed by forming the cathode, transferring it to another chamber without breaking the vacuum, and forming silicon nitride having a thickness of 2 μm by the CVD method. The protection layer may be provided using an atomic deposition (ALD) method after deposition of the protection layer using the CVD method. The material of the protection layer by the ALD method is not limited but can be silicon nitride, silicon oxide, aluminum oxide, or the like. Silicon nitride may further be formed by the CVD method on the protection layer formed by the ALD method. The protection layer formed by the ALD method may have a film thickness smaller than that of the protection layer formed by the CVD method. More specifically, the film thickness of the protection layer formed by the ALD method may be 50% or less, or 10% or less of that of the protection layer formed by the CVD method.

Color Filter

A color filter may be provided on the protection layer. For example, a color filter considering the size of the organic light emitting element may be provided on another substrate, and the substrate with the color filter formed thereon may be bonded to the substrate with the organic light emitting element provided thereon. Alternatively, for example, a color filter may be patterned on the above-described protection layer using a photolithography technique. The color filter may be formed from a polymeric material.

Planarizing Layer

A planarizing layer may be arranged between the color filter and the protection layer. The planarizing layer is provided to reduce unevenness of the layer below the planarizing layer. The planarizing layer may be called a material resin layer without limiting the purpose of the layer. The planarizing layer may be formed from an organic compound, and may be made of a low-molecular material or a polymeric material. In consideration of reduction of unevenness, a polymeric organic compound may be used for the planarizing layer.

The planarizing layers may be provided above and below the color filter. In that case, the same or different constituent materials may be used for these planarizing layers. More specifically, examples of the material of the planarizing layer include polyvinyl carbazole resin, polycarbonate resin, polyester resin, ABS resin, acrylic resin, polyimide resin, phenol resin, epoxy resin, silicone resin, and urea resin.

Microlens

The organic light emitting device may include an optical member such as a microlens on the light emission side. The microlens can be made of acrylic resin, epoxy resin, or the like. The microlens can aim to increase the amount of light extracted from the organic light emitting device and control the direction of light to be extracted. The microlens can have a hemispherical shape. If the microlens has a hemispherical shape, among tangents contacting the hemisphere, there is a tangent parallel to the insulating layer, and the contact between the tangent and the hemisphere is the vertex of the microlens. The vertex of the microlens can be decided in the same manner even in an arbitrary sectional view. That is, among tangents contacting the semicircle of the microlens in a sectional view, there is a tangent parallel to the insulating layer, and the contact between the tangent and the semicircle is the vertex of the microlens.

Furthermore, the middle point of the microlens can also be defined. In the section of the microlens, a line segment from a point at which an arc shape ends to a point at which another arc shape ends is assumed, and the middle point of the line segment can be called the middle point of the microlens. A section for determining the vertex and the middle point may be a section perpendicular to the insulating layer.

The microlens includes a first surface including a convex portion and a second surface opposite to the first surface. The second surface can be arranged on the functional layer (light emitting layer) side of the first surface. For this arrangement, the microlens needs to be formed on the light emitting device. If the functional layer is an organic layer, a process which produces high temperature in the manufacturing step of the microlens may be avoided. In addition, if it is configured to arrange the second surface on the functional layer side of the first surface, all the glass transition temperatures of an organic compound forming the organic layer may be 100° C. or more. For example, 130° C. or more is suitable.

Counter Substrate

A counter substrate may be arranged on the planarizing layer. The counter substrate is called a counter substrate because it is provided at a position corresponding to the above-described substrate. The constituent material of the counter substrate can be the same as that of the above-described substrate. If the above-described substrate is the first substrate, the counter substrate can be the second substrate.

Organic Layer

The organic compound layer (hole injection layer, hole transport layer, electron blocking layer, light emitting layer, hole blocking layer, electron transport layer, electron injection layer, and the like) forming the organic light emitting element according to an embodiment of the present disclosure may be formed by the method to be described below.

The organic compound layer forming the organic light emitting element according to the embodiment of the present disclosure can be formed by a dry process using a vacuum deposition method, an ionization deposition method, a sputtering method, a plasma method, or the like. Instead of the dry process, a wet process that forms a layer by dissolving a solute in an appropriate solvent and using a well-known coating method (for example, a spin coating method, a dipping method, a casting method, an LB method, an inkjet method, or the like) can be used.

Here, when the layer is formed by a vacuum deposition method, a solution coating method, or the like, crystallization or the like hardly occurs and excellent temporal stability is obtained. Furthermore, when the layer is formed using a coating method, it is possible to form the film in combination with a suitable binder resin.

Examples of the binder resin include polyvinyl carbazole resin, polycarbonate resin, polyester resin, ABS resin, acrylic resin, polyimide resin, phenol resin, epoxy resin, silicone resin, and urea resin. However, the binder resin is not limited to them.

One of these binder resins may be used singly as a homopolymer or a copolymer, or two or more of them may be used in combination. Furthermore, additives such as a well-known plasticizer, antioxidant, and an ultraviolet absorber may also be used as needed.

Pixel Circuit

The light emitting device can include a pixel circuit connected to the light emitting element. The pixel circuit may be an active matrix circuit that individually controls light emission of the first and second light emitting elements. The active matrix circuit may be a voltage or current programing circuit. A driving circuit includes a pixel circuit for each pixel. The pixel circuit can include a light emitting element, a transistor for controlling light emission luminance of the light emitting element, a transistor for controlling a light emission timing, a capacitor for holding the gate voltage of the transistor for controlling the light emission luminance, and a transistor for connection to GND without intervention of the light emitting element.

The light emitting device includes a display region and a peripheral region arranged around the display region. The light emitting device includes the pixel circuit in the display region and a display control circuit in the peripheral region. The mobility of the transistor forming the pixel circuit may be smaller than that of a transistor forming the display control circuit.

The slope of the current-voltage characteristic of the transistor forming the pixel circuit may be smaller than that of the current-voltage characteristic of the transistor forming the display control circuit. The slope of the current-voltage characteristic can be measured by a so-called Vg-Ig characteristic.

The transistor forming the pixel circuit is a transistor connected to the light emitting element such as the first light emitting element.

Pixel

The organic light emitting device includes a plurality of pixels. Each pixel includes sub-pixels that emit light components of different colors. The sub-pixels may include, for example, R, G, and B emission colors, respectively.

In each pixel, a region also called a pixel opening emits light. The pixel opening can have a size of 5 μm (inclusive) to 15 μm (inclusive). More specifically, the pixel opening can have a size of 11 μm, 9.5 μm, 7.4 μm, 6.4 μm, or the like.

A distance between the sub-pixels can be 10 μm or less, and can be, more specifically, 8 μm, 7.4 μm, or 6.4 μm.

The pixels can have a known arrangement form in a plan view. For example, the pixels may have a stripe arrangement, a delta arrangement, a pentile arrangement, or a Bayer arrangement. The shape of each sub-pixel in a plan view may be any known shape. For example, a quadrangle such as a rectangle or a rhombus, a hexagon, or the like may be possible. A shape which is not a correct shape but is close to a rectangle is included in a rectangle, as a matter of course. The shape of the sub-pixel and the pixel arrangement can be used in combination.

Application of Organic Light Emitting Element of Embodiment of Present Disclosure The organic light emitting element according to an embodiment of the present disclosure can be used as a constituent member of a display device or an illumination device. In addition, the organic light emitting element is applicable to the exposure light source of an electrophotographic image forming device, the backlight of a liquid crystal display device, a light emitting device including a color filter in a white light source, and the like.

The display device may be an image information processing device that includes an image input unit for inputting image information from an area CCD, a linear CCD, a memory card, or the like, and an information processing unit for processing the input information, and displays the input image on a display unit.

In addition, a display unit included in an image capturing device or an inkjet printer can have a touch panel function. The driving type of the touch panel function may be an infrared type, a capacitance type, a resistive film type, or an electromagnetic induction type, and is not particularly limited. The display device may be used for the display unit of a multifunction printer.

Figure 18A:
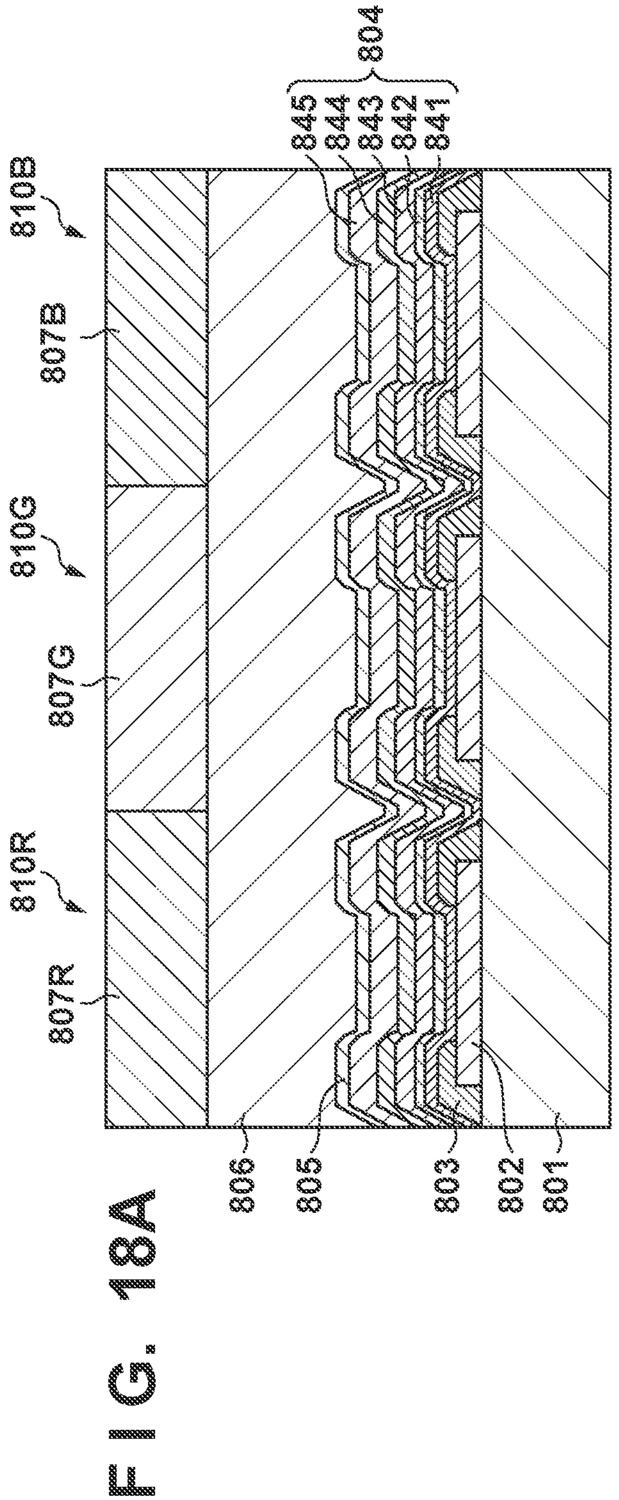
FIGS. 18A and 18B are sectional views showing an example of the arrangement of the pixel of the light emitting device shown in FIG. 1.

More details will be described next with reference to the accompanying drawings. FIG. 18A shows an example of a pixel as a constituent element of the above-described pixel array 105. The pixel includes sub-pixels 810 (pixels 101). The sub-pixels are divided into sub-pixels 810R, 810G, and 810B by emitted light components. The light emission colors may be discriminated by the wavelengths of light components emitted from the light emitting layers, or light emitted from each sub-pixel may be selectively transmitted or undergo color conversion by a color filter or the like. Each sub-pixel includes a reflective electrode 802 as the first electrode on an interlayer insulating layer 801, an insulating layer 803 covering the end of the reflective electrode 802, an organic compound layer 804 covering the first electrode and the insulating layer, a transparent electrode 805 as the second electrode, a protection layer 806, and a color filter 807.

The interlayer insulating layer 801 can include a transistor and a capacitive element arranged in the interlayer insulating layer 801 or a layer below it. The transistor and the first electrode can electrically be connected via a contact hole (not shown) or the like.

The insulating layer 803 can also be called a bank or a pixel separation film. The insulating layer 803 covers the end of the first electrode, and is arranged to surround the first electrode. A portion of the first electrode where no insulating layer 803 is arranged is in contact with the organic compound layer 804 to form a light emitting region.

The organic compound layer 804 includes a hole injection layer 841, a hole transport layer 842, a first light emitting layer 843, a second light emitting layer 844, and an electron transport layer 845.

The second electrode may be a transparent electrode, a reflective electrode, or a semi-transmissive electrode.

The protection layer 806 suppresses permeation of water into the organic compound layer. The protection layer is shown as a single layer but may include a plurality of layers. Each layer can be an inorganic compound layer or an organic compound layer.

The color filter 807 is divided into color filters 807R, 807G, and 807B by colors. The color filters can be formed on a planarizing film (not shown). A resin protection layer (not shown) may be arranged on the color filters. The color filters can be formed on the protection layer 806. Alternatively, the color filters can be provided on the counter substrate such as a glass substrate, and then the substrate may be bonded.

Figure 18B:
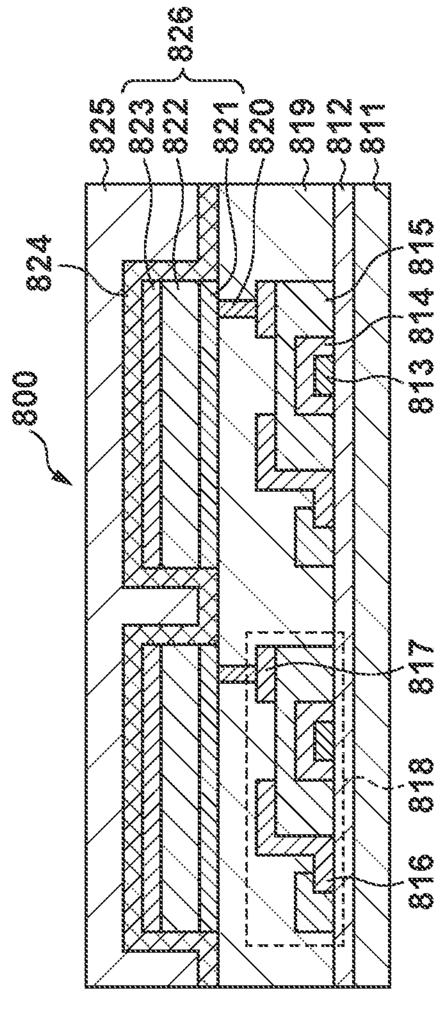

A display device 800 (corresponding to the above-described light emitting device 100) shown in FIG. 18B is provided with an organic light emitting element 826 and a TFT 818 as an example of a transistor. A substrate 811 of glass, silicon, or the like is provided and an insulating layer 812 is provided on the substrate 811. The active element such as the TFT 818 is arranged on the insulating layer, and a gate electrode 813, a gate insulating film 814, and a semiconductor layer 815 of the active element are arranged. The TFT 818 further includes the semiconductor layer 815, a drain electrode 816, and a source electrode 817. An insulating film 819 is provided on the TFT 818. The source electrode 817 and an anode 821 forming the organic light emitting element 826 are connected via a contact hole 820 formed in the insulating film.

A method of electrically connecting the electrodes (anode and cathode) included in the organic light emitting element 826 and the electrodes (source electrode and drain electrode) included in the TFT is not limited to that shown in FIG. 18B. That is, one of the anode and cathode and one of the source electrode and drain electrode of the TFT are electrically connected. The TFT indicates a thin-film transistor.

In the display device 800 shown in FIG. 18B, an organic compound layer is illustrated as one layer. However, an organic compound layer 822 may include a plurality of layers. A first protection layer 824 and a second protection layer 825 are provided on a cathode 823 to suppress deterioration of the organic light emitting element.

A transistor is used as a switching element in the display device 800 shown in FIG. 18B but may be used as another switching element.

The transistor used in the display device 800 shown in FIG. 18B is not limited to a transistor using a single-crystal silicon wafer, and may be a thin-film transistor including an active layer on an insulating surface of a substrate. Examples of the active layer include single-crystal silicon, amorphous silicon, non-single-crystal silicon such as microcrystalline silicon, and a non-single-crystal oxide semiconductor such as indium zinc oxide and indium gallium zinc oxide. Note that a thin-film transistor is also called a TFT element.

The transistor included in the display device 800 shown in FIG. 18B may be formed in the substrate such as a silicon substrate. Forming the transistor in the substrate means forming the transistor by processing the substrate such as a silicon substrate. That is, when the transistor is included in the substrate, it can be considered that the substrate and the transistor are formed integrally.

The light emission luminance of the organic light emitting element according to this embodiment can be controlled by the TFT which is an example of a switching element, and the plurality of organic light emitting elements can be provided in a plane to display an image with the light emission luminances of the respective elements. Here, the switching element according to this embodiment is not limited to the TFT, and may be a transistor formed from low-temperature polysilicon or an active matrix driver formed on the substrate such as a silicon substrate. The term "on the substrate" may mean "in the substrate". Whether to provide a transistor in the substrate or use a TFT is selected based on the size of the display unit. For example, if the size is about 0.5 inch, the organic light emitting element may be provided on the silicon substrate.

Figure 19A:
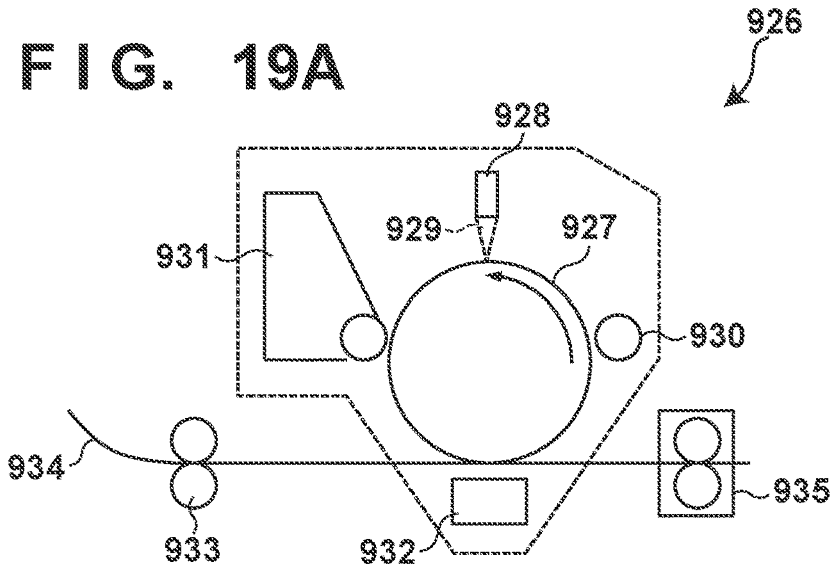
FIGS. 19A to 19C are views showing an example of an image forming device using the light emitting device according to the embodiment.
Figure 19B:
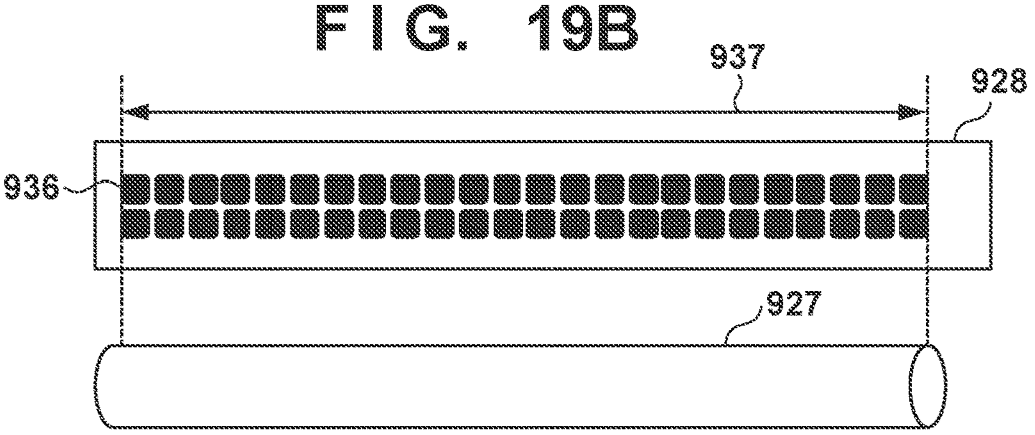
Figure 19C:
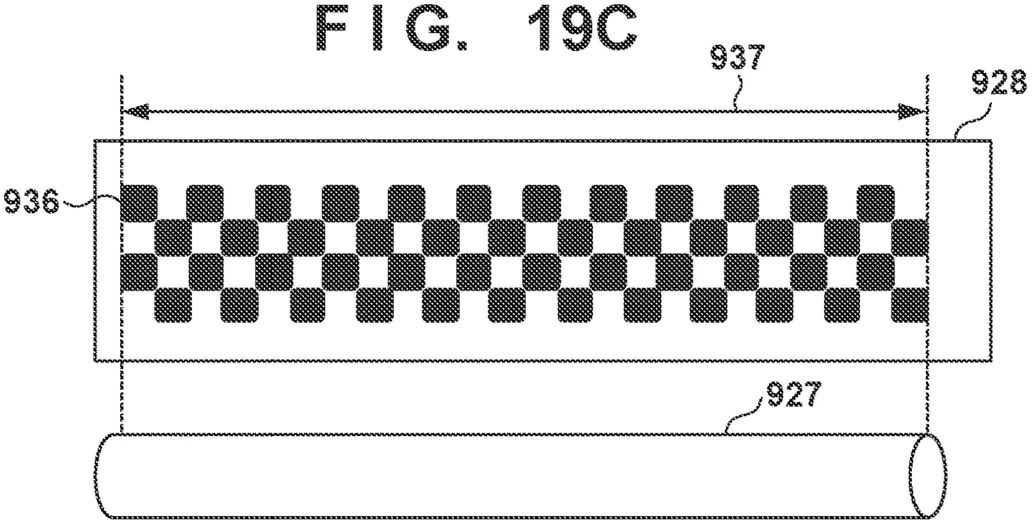

FIGS. 19A to 19C are schematic views showing an example of an image forming device using the light emitting device 100 according to this embodiment. An image forming device 926 shown in FIG. 19A includes a photosensitive member 927, an exposure light source 928, a developing unit 931, a charging unit 930, a transfer device 932, a conveyance unit 933 (a conveyance roller in the arrangement shown in FIG. 19A), and a fixing device 935.

Light 929 is emitted from the exposure light source 928, and an electrostatic latent image is formed on the surface of the photosensitive member 927. The light emitting device 100 can be applied to the exposure light source 928. The developing unit 931 can function as a developing device that contains a toner or the like as a developing agent and applies the developing agent to the exposed photosensitive member 927. The charging unit 930 charges the photosensitive member 927. The transfer device 932 transfers the developed image to a print medium 934. The conveyance unit 933 conveys the print medium 934. The print medium 934 can be, for example, paper or a film. The fixing device 935 fixes the image formed on the print medium.

Each of FIGS. 19B and 19C is a schematic view showing a plurality of light emitting units 936 arranged along the longitudinal direction on a long substrate in the exposure light source 928. The light emitting device 100 can be applied to the light emitting units 936. That is, the plurality of pixels 101 arranged in the pixel array 105 are arranged along the longitudinal direction of the substrate. A direction 937 is a direction parallel to the axis of the photosensitive member 927. This column direction matches the direction of the axis upon rotating the photosensitive member 927. This direction 937 can be referred to as the long-axis direction of the photosensitive member 927.

FIG. 19B shows a form in which the light emitting units 936 are arranged along the long-axis direction of the photosensitive member 927. FIG. 19C shows a form, which is a modification of the arrangement of the light emitting units 936 shown in FIG. 19B, in which the light emitting units 936 are arranged in the column direction alternately between the first column and the second column. The light emitting units 936 are arranged at different positions in the row direction between the first column and the second column. In the first column, multiple light emitting units 936 are arranged spaced apart from each other. In the second column, the light emitting unit 936 is arranged at the position corresponding to the space between the light emitting units 936 in the first column. Also in the row direction, multiple light emitting units 936 are arranged spaced apart from each other. The arrangement of the light emitting units 936 shown in FIG. 19C can be referred to as, for example, an arrangement in a grid pattern, an arrangement in a staggered pattern, or an arrangement in a checkered pattern.

Figure 20:
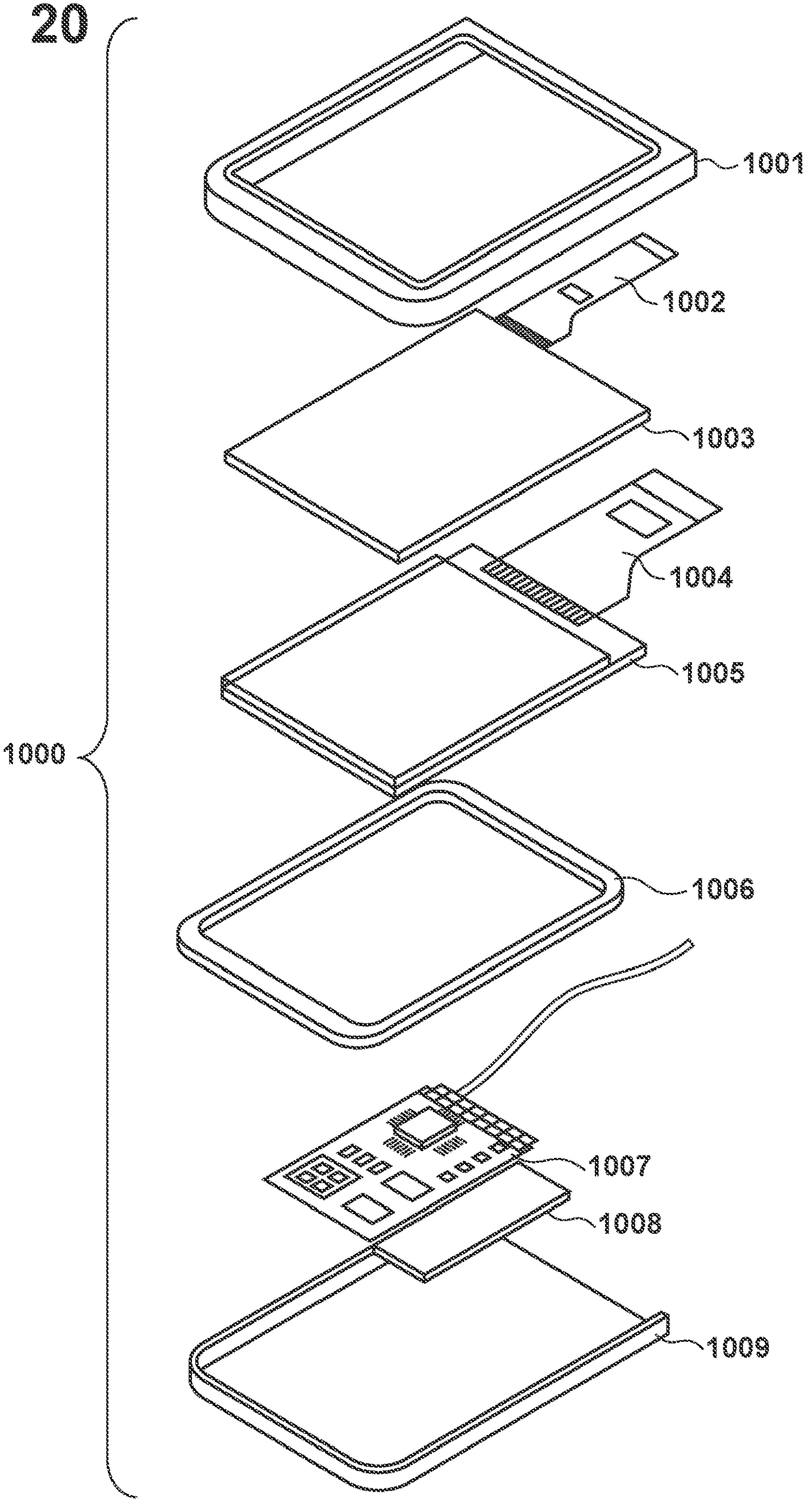
FIG. 20 is a view showing an example of a display device using the light emitting device according to the embodiment.

FIG. 20 is a schematic view showing an example of the display device using the light emitting device 100 of this embodiment. A display device 1000 can include a touch panel 1003, a display panel 1005, a frame 1006, a circuit board 1007, and a battery 1008 between an upper cover 1001 and a lower cover 1009. Flexible printed circuits (FPCs) 1002 and 1004 are respectively connected to the touch panel 1003 and the display panel 1005. Active elements such as transistors are arranged on the circuit board 1007. The battery 1008 is unnecessary if the display device 1000 is not a portable apparatus. Even when the display device 1000 is a portable apparatus, the battery 1008 need not be provided at this position. The light emitting device 100 can be applied to the display panel 1005. The pixels 101 arranged in the pixel array 105 of the light emitting device 100 functioning as the display panel 1005 operate in a state in which they are connected to the active elements such as transistors arranged on the circuit board 1007.

The display device 1000 shown in FIG. 20 can be used for a display unit of a photoelectric conversion device (also referred to as an image capturing device) including an optical unit having a plurality of lenses, and an image sensor for receiving light having passed through the optical unit and photoelectrically converting the light into an electric signal. The photoelectric conversion device can include a display unit for displaying information acquired by the image sensor. In addition, the display unit can be either a display unit exposed outside the photoelectric conversion device, or a display unit arranged in the finder. The photoelectric conversion device can be a digital camera or a digital video camera.

Figure 21:
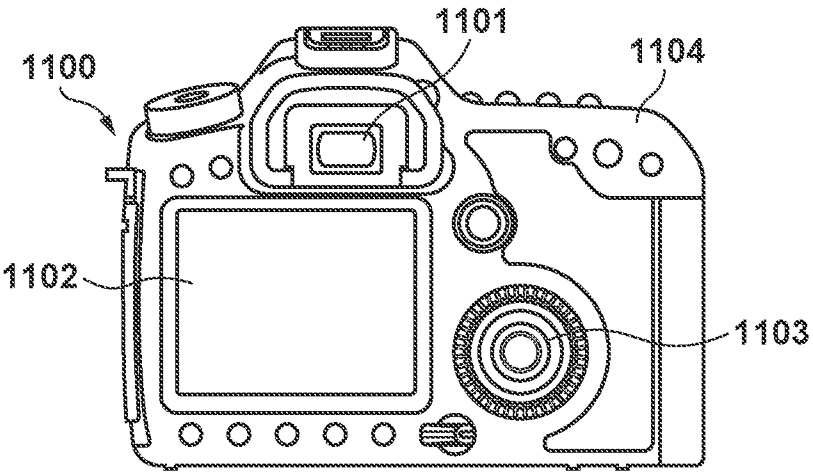
FIG. 21 is a view showing an example of a photoelectric conversion device using the light emitting device according to the embodiment.

FIG. 21 is a schematic view showing an example of the photoelectric conversion device using the light emitting device 100 of this embodiment. A photoelectric conversion device 1100 can include a viewfinder 1101, a rear display 1102, an operation unit 1103, and a housing 1104. The photoelectric conversion device 1100 can also be called an image capturing device. The light emitting device 100 according to this embodiment can be applied to the viewfinder 1101 or the rear display 1102 as a display unit. In this case, the pixel array 105 of the light emitting device 100 can display not only an image to be captured but also environment information, image capturing instructions, and the like. Examples of the environment information are the intensity and direction of external light, the moving velocity of an object, and the possibility that an object is covered with an obstacle.

The timing suitable for image capturing is a very short time in many cases, so the information should be displayed as soon as possible. Therefore, the light emitting device 100 in which the pixel 101 including the light emitting element 110 using the organic light emitting material such as an organic EL element is arranged in the pixel array 105 may be used for the viewfinder 1101 or the rear display 1102. This is so because the organic light emitting material has a high response speed. The light emitting device 100 using the organic light emitting material can be used for the devices that require a high display speed more suitably than for the liquid crystal display device.

The photoelectric conversion device 1100 includes an optical unit (not shown). This optical unit has a plurality of lenses, and forms an image on a photoelectric conversion element (not shown) that receives light having passed through the optical unit and is accommodated in the housing 1104. The focal points of the plurality of lenses can be adjusted by adjusting the relative positions. This operation can also automatically be performed.

The light emitting device 100 may be applied to a display unit of an electronic apparatus. At this time, the display unit can have both a display function and an operation function. Examples of the portable terminal are a portable phone such as a smartphone, a tablet, and a head mounted display.

Figure 22:
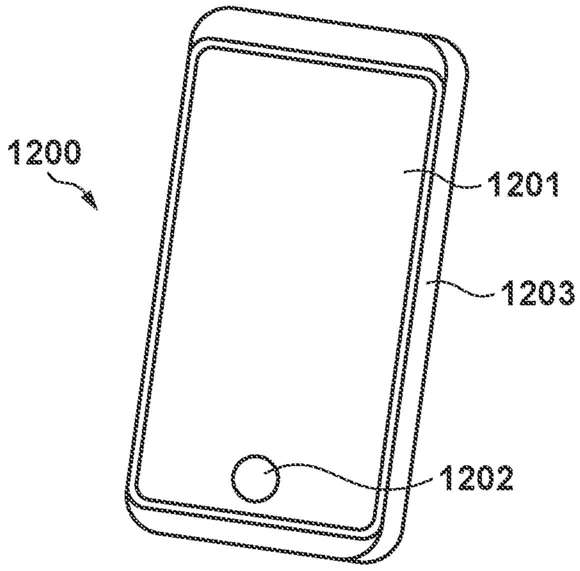
FIG. 22 is a view showing an example of an electronic apparatus using the light emitting device according to the embodiment.

FIG. 22 is a schematic view showing an example of an electronic apparatus using the light emitting device 100 of this embodiment. An electronic apparatus 1200 includes a display unit 1201, an operation unit 1202, and a housing 1203. The housing 1203 can accommodate a circuit, a printed board having this circuit, a battery, and a communication unit. The operation unit 1202 can be a button or a touch-panel-type reaction unit. The operation unit 1202 can also be a biometric authentication unit that performs unlocking or the like by authenticating the fingerprint. The portable apparatus including the communication unit can also be regarded as a communication apparatus. The light emitting device 100 according to this embodiment can be applied to the display unit 1201.

Figure 23A:
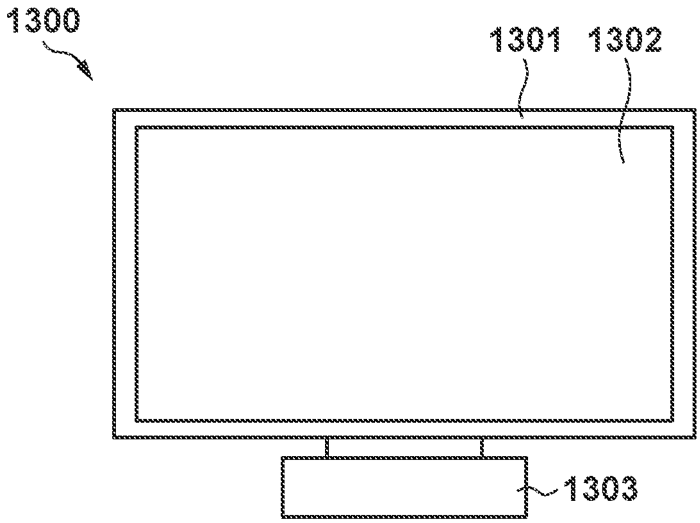
FIGS. 23A and 23B are views each showing an example of a display device using the light emitting device according to the embodiment.
Figure 23B:
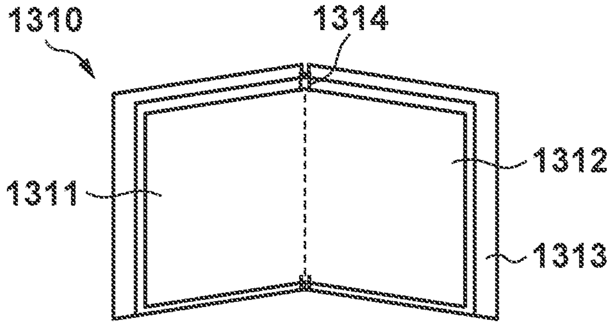

FIGS. 23A and 23B are schematic views showing examples of the display device using the light emitting device 100 of this embodiment. FIG. 23A shows a display device such as a television monitor or a PC monitor. A display device 1300 includes a frame 1301 and a display unit 1302. The light emitting device 100 according to this embodiment can be applied to the display unit 1302. The display device 1300 can include a base 1303 that supports the frame 1301 and the display unit 1302. The base 1303 is not limited to the form shown in FIG. 23A. For example, the lower side of the frame 1301 may also function as the base 1303. In addition, the frame 1301 and the display unit 1302 can be bent. The radius of curvature in this case can be 5,000 mm (inclusive) to 6,000 mm (inclusive).

FIG. 23B is a schematic view showing another example of the display device using the light emitting device 100 of this embodiment. A display device 1310 shown in FIG. 23B can be folded, and is a so-called foldable display device. The display device 1310 includes a first display unit 1311, a second display unit 1312, a housing 1313, and a bending point 1314. The light emitting device 100 according to this embodiment can be applied to each of the first display unit 1311 and the second display unit 1312. The first display unit 1311 and the second display unit 1312 can also be one seamless display device. The first display unit 1311 and the second display unit 1312 can be divided by the bending point. The first display unit 1311 and the second display unit 1312 can display different images, and can also display one image together.

Figure 24:
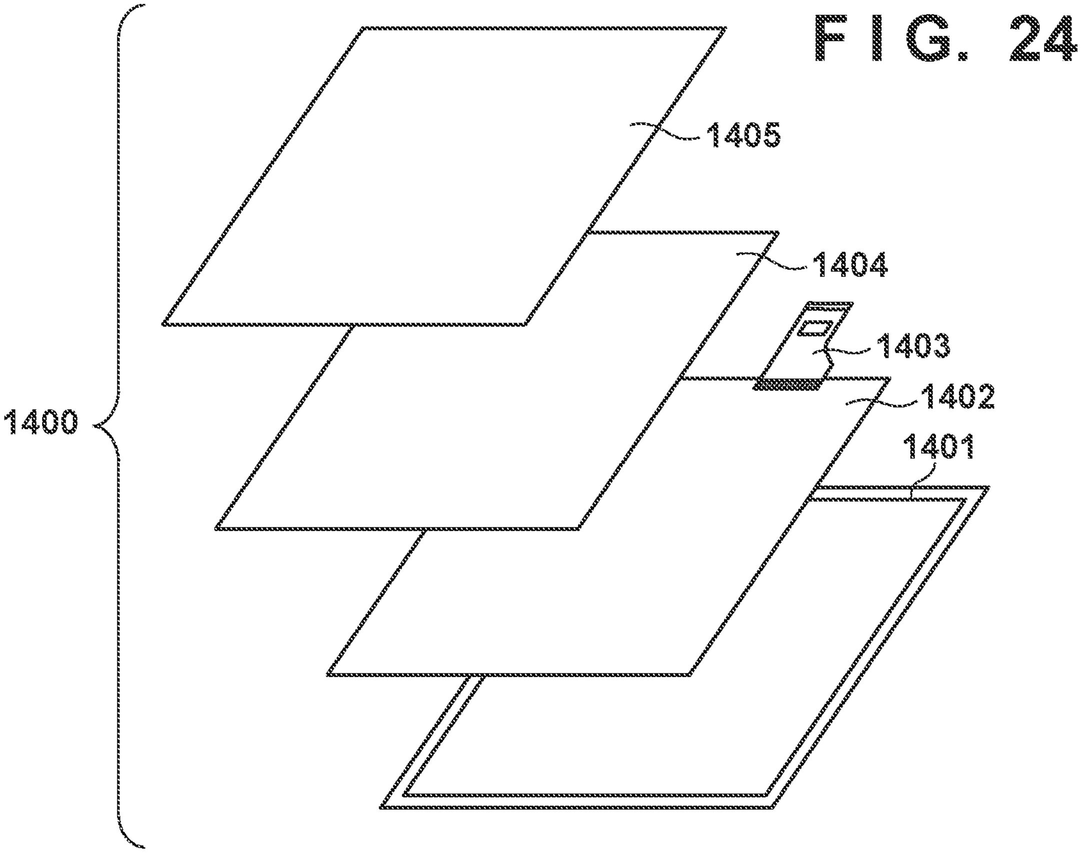
FIG. 24 is a view showing an example of an illumination device using the light emitting device according to the embodiment.

FIG. 24 is a schematic view showing an example of an illumination device using the light emitting device 100 according to this embodiment. An illumination device 1400 may include a housing 1401, a light source 1402, a circuit board 1403, an optical film 1404, and a light diffusion unit 1405. The light emitting device 100 according to this embodiment can be applied to the light source 1402. The optical film 1404 may be a filter that improves the color rendering property of the light source. The light diffusion unit 1405 can effectively diffuse light from the light source to illuminate a wide range for lighting up or the like. A cover may be provided in the outermost portion, as needed. The illumination device 1400 may include both the optical film 1404 and the light diffusion unit 1405, or may include only one of them.

The illumination device 1400 is, for example, a device that illuminates a room. The illumination device 1400 may emit light of white, day white, or any other color from blue to red. The illumination device 1400 may include a light control circuit for controlling the light color. The illumination device 1400 may include a power supply circuit connected to the light emitting device 100 which functions as the light source 1402. The power supply circuit is a circuit that converts an AC voltage into a DC voltage. Note that white light has a color temperature of 4200 K, and day-white light has a color temperature of 5000 K. The illumination device 1400 may also include a color filter. Further, the illumination device 1400 may include a heat dissipation portion. The heat dissipation portion releases the heat in the device to the outside of the device, and examples thereof include a metal having high specific heat, liquid silicon, and the like.

Figure 25:
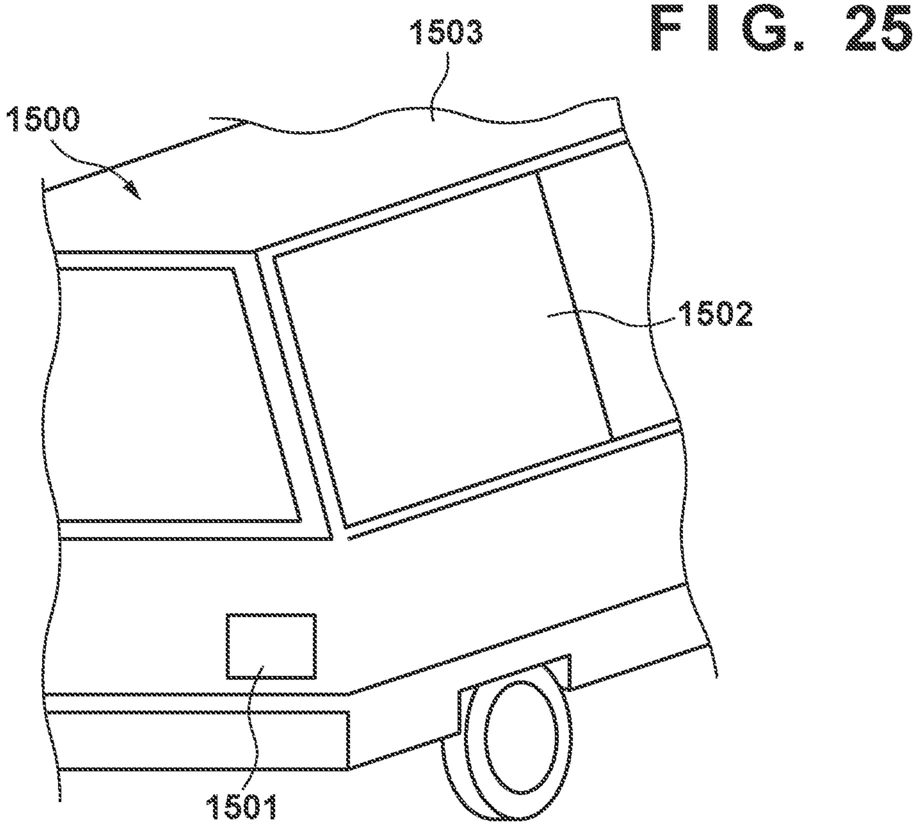
FIG. 25 is a view showing an example of a moving body using the light emitting device according to the embodiment.

FIG. 25 is a schematic view showing an automobile including a tail lamp which is an example of the lighting unit for an automobile using the light emitting device 100 according to this embodiment. An automobile 1500 includes a tail lamp 1501, and may turn on the tail lamp 1501 when a brake operation or the like is performed. The light emitting device 100 according to this embodiment may be used in a head lamp as the lighting unit for an automobile. The automobile is an example of a moving body, and the moving body may be a ship, a drone, an aircraft, a railroad car, an industrial robot, or the like. The moving body may include a body and a lighting unit provided in the body. The lighting unit may inform the current position of the body.

The light emitting device 100 according to this embodiment can be applied to the tail lamp 1501. The tail lamp 1501 may include a protective member that protects the light emitting device 100 which functions as the tail lamp 1501. The protective member has a certain degree of strength, and can be made from any material as long as it is transparent. The protective member may be made from polycarbonate or the like. Further, the protective member may be made from polycarbonate mixed with furandicarboxylic acid derivative, acrylonitrile derivative, or the like.

The automobile 1500 may include a body 1503 and windows 1502 attached thereto. The window may be a window for checking the front or rear of the automobile, or may a transparent display such as a head-up display. The light emitting device 100 according to this embodiment may be used in the transparent display. In this case, the components such as the electrodes included in the light emitting device 100 are formed by transparent members.

Figure 26A:
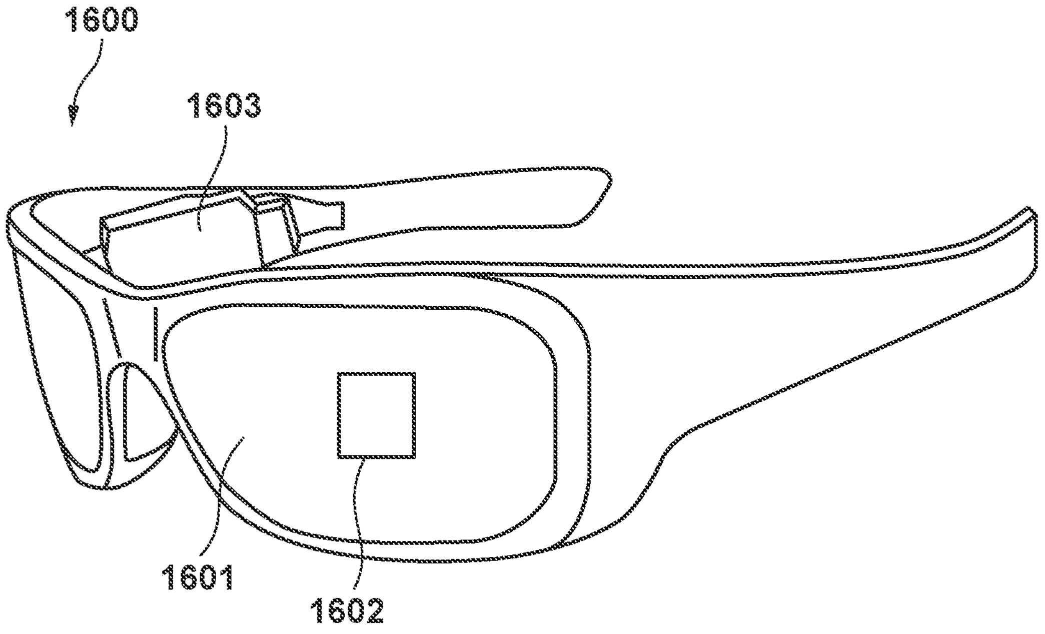
FIGS. 26A and 26B are views each showing an example of a wearable device using the light emitting device according to the embodiment.
Figure 26B:
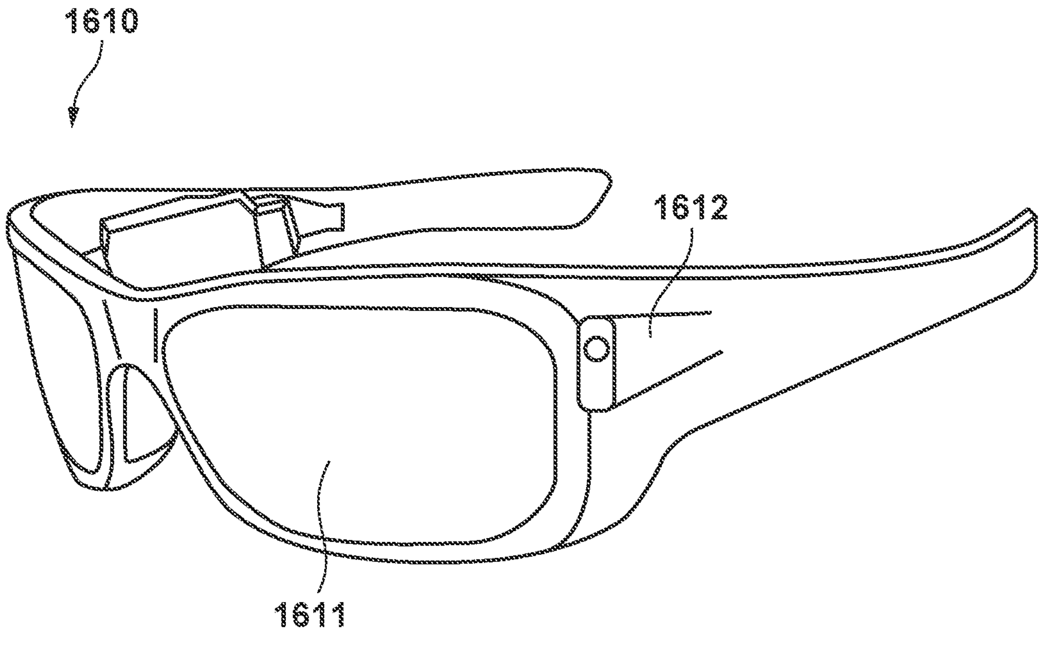

Further application examples of the light emitting device 100 according to this embodiment will be described with reference to FIGS. 26A and 26B. The light emitting device 100 can be applied to a system that can be worn as a wearable device such as smartglasses, a Head Mounted Display (HMD), or a smart contact lens. An image capturing display device used for such application examples includes an image capturing device capable of photoelectrically converting visible light and a light emitting device capable of emitting visible light.

Glasses 1600 (smartglasses) according to one application example will be described with reference to FIG. 26A. An image capturing device 1602 such as a CMOS sensor or an SPAD is provided on the surface side of a lens 1601 of the glasses 1600. In addition, the light emitting device 100 according to this embodiment is provided on the back surface side of the lens 1601.

The glasses 1600 further include a control device 1603. The control device 1603 functions as a power supply that supplies electric power to the image capturing device 1602 and the light emitting device 100 according to each embodiment. In addition, the control device 1603 controls the operations of the image capturing device 1602 and the light emitting device 100. An optical system configured to condense light to the image capturing device 1602 is formed on the lens 1601.

Glasses 1610 (smartglasses) according to one application example will be described with reference to FIG. 26B. The glasses 1610 include a control device 1612, and an image capturing device corresponding to the image capturing device 1602 and the light emitting device 100 are mounted on the control device 1612. The image capturing device in the control device 1612 and an optical system configured to project light emitted from the light emitting device 100 are formed in a lens 1611, and an image is projected to the lens 1611. The control device 1612 functions as a power supply that supplies electric power to the image capturing device and the light emitting device 100, and controls the operations of the image capturing device and the light emitting device 100. The control device 1612 may include a line-of-sight detection unit that detects the line of sight of a wearer. The detection of a line of sight may be done using infrared rays. An infrared ray emitting unit emits infrared rays to an eyeball of the user who is gazing at a displayed image. An image capturing unit including a light receiving element detects reflected light of the emitted infrared rays from the eyeball, thereby obtaining a captured image of the eyeball. A reduction unit for reducing light from the infrared ray emitting unit to the display unit in a planar view is provided, thereby reducing deterioration of image quality.

The line of sight of the user to the displayed image is detected from the captured image of the eyeball obtained by capturing the infrared rays. An arbitrary known method can be applied to the line-of-sight detection using the captured image of the eyeball. As an example, a line-of-sight detection method based on a Purkinje image obtained by reflection of irradiation light by a cornea can be used.

More specifically, line-of-sight detection processing based on pupil center corneal reflection is performed. Using pupil center corneal reflection, a line-of-sight vector representing the direction (rotation angle) of the eyeball is calculated based on the image of the pupil and the Purkinje image included in the captured image of the eyeball, thereby detecting the line-of-sight of the user.

The light emitting device 100 according to the embodiment of the present disclosure can include an image capturing device including a light receiving element, and control a displayed image based on the line-of-sight information of the user from the image capturing device.

More specifically, the light emitting device 100 decides a first visual field region at which the user is gazing and a second visual field region other than the first visual field region based on the line-of-sight information. The first visual field region and the second visual field region may be decided by the control device of the light emitting device 100, or those decided by an external control device may be received. In the display region of the light emitting device 100, the display resolution of the first visual field region may be controlled to be higher than the display resolution of the second visual field region. That is, the resolution of the second visual field region may be lower than that of the first visual field region.

In addition, the display region includes a first display region and a second display region different from the first display region, and a region of higher priority is decided from the first display region and the second display region based on line-of-sight information. The first display region and the second display region may be decided by the control device of the light emitting device 100, or those decided by an external control device may be received. The resolution of the region of higher priority may be controlled to be higher than the resolution of the region other than the region of higher priority. That is, the resolution of the region of relatively low priority may be low.

Note that AI may be used to decide the first visual field region or the region of higher priority. The AI may be a model configured to estimate the angle of the line of sight and the distance to a target ahead the line of sight from the image of the eyeball using the image of the eyeball and the direction of actual viewing of the eyeball in the image as supervised data. The AI program may be held by the light emitting device 100, the image capturing device, or an external device. If the external device holds the AI program, it is transmitted to the light emitting device 100 via communication.

When performing display control based on line-of-sight detection, smartglasses further including an image capturing device configured to capture the outside can be applied. The smartglasses can display captured outside information in real time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008182, filed Jan. 23, 2023, which is hereby incorporated by reference herein in its entirety.

What is claimed is:

1. A light emitting device comprising:

a plurality of pixels arranged so as to form a plurality of rows and a plurality of columns, each pixel including a light emitting element and a driving transistor configured to supply a current corresponding to a luminance signal to the light emitting element; and a driving circuit comprising a scanning circuit configured to perform write scanning of scanning the plurality of pixels on a row basis and writing the luminance signal in a gate of the driving transistor, wherein the driving circuit performs, only during a period from an activation of the light emitting device to a start of the write scanning when the write scanning is performed for a first time, a signal write operation of collectively writing a predetermined signal in the gates of the driving transistors included in pixels arranged in not less than two rows among the plurality of pixels.

2. The device according to claim 1, wherein the predetermined signal is a signal that sets a luminance of the light emitting element to not more than 0.1 cd/$m^2$, or a signal that sets the luminance of the light emitting element to not more than a black level in the luminance signal.

3. The device according to claim 1, further including a signal output circuit configured to supply the luminance signal via a signal line arranged so as to correspond to pixels arranged in a column direction among the plurality of pixels, wherein each of the plurality of pixels further includes a write transistor arranged between the gate of the driving transistor and the signal line, and during the period from the activation of the light emitting device to the start of the write scanning when the write scanning is performed for the first time, the predetermined signal is written in the gate of the driving transistor by the signal output circuit supplying the predetermined signal to the signal line and the driving circuit turning on the write transistor.

4. The device according to claim 3, wherein during the period from the activation of the light emitting device to the start of the write scanning when the write scanning is performed for the first time, the driving circuit turns off the write transistor after the predetermined signal is written in the gate of the driving transistor and before a signal supplied from the signal output circuit to the signal line is changed from the predetermined signal.

5. The device according to claim 3, wherein the signal output circuit includes a driver circuit configured to output the luminance signal to the signal line, the predetermined signal is supplied to an output node of the driver circuit via a switch, and during the period from the activation of the light emitting device to the start of the write scanning when the write scanning is performed for the first time, the switch is turned on.

6. The device according to claim 3, wherein the signal output circuit includes a driver circuit configured to output the luminance signal to the signal line, the predetermined signal is supplied to an input node of the driver circuit via a switch, and during the period from the activation of the light emitting device to the start of the write scanning when the write scanning is performed for the first time, the switch is turned on.

7. The device according to claim 3, wherein the signal output circuit includes a driver circuit configured to output the luminance signal to the signal line, and the driver circuit is configured to be capable of selectively outputting the luminance signal and the predetermined signal.

8. The device according to claim 1, further including a signal output circuit configured to supply the luminance signal via a first signal line arranged so as to correspond to pixels arranged in a column direction among the plurality of pixels, and a second signal line to which the predetermined signal is supplied, wherein each of the plurality of pixels further includes a first write transistor arranged between the gate of the driving transistor and the first signal line, and a second write transistor arranged between the gate of the driving transistor and the second signal line, and during the period from the activation of the light emitting device to the start of the write scanning when the write scanning is performed for the first time, the predetermined signal is written in the gate of the driving transistor by the driving circuit turning on the second write transistor.

9. The device according to claim 1, wherein the driving circuit is configured to be capable of displaying an image in a display region formed by pixels arranged in some rows among the plurality of pixels, and shifts a position of the display region at a predetermined timing, the display region includes a first display region where an image is first displayed after the activation of the light emitting device, and a second display region where an image is displayed at a timing after an image is displayed in the first display region, and the not less than two rows include rows not included in the first display region but included in the second display region.

10. The device according to claim 9, wherein each of the plurality of pixels further includes a light emission control transistor arranged in a current path including the light emitting element and the driving transistor, and configured to control light emission of the light emitting element, and the driving circuit further includes a light emission scanning circuit configured to turn on the light emission control transistor of the pixel in the row included in the display region among the plurality of pixels by scanning, on a row basis, pixels arranged in rows in the display region among the plurality of pixels.

11. The device according to claim 10, wherein each of the scanning circuit and the light emission scanning circuit includes a shift register.

12. The device according to claim 1, wherein the driving circuit performs the signal write operation in accordance with the activation of the light emitting device.

13. The device according to claim 1, wherein a current path including the light emitting element and the driving transistor is arranged between a first power supply line configured to supply a first potential and a second power supply line configured to supply a second potential lower than the first potential, and a potential of the predetermined signal is the same potential as the first potential.

14. The device according to claim 1, wherein a current path including the light emitting element and the driving transistor is arranged between a first power supply line configured to supply a first potential and a second power supply line configured to supply a second potential lower than the first potential, the light emitting device further includes a detection circuit configured to detect a potential of the first power supply line, and the driving circuit performs the signal write operation during a period until the detection circuit detects that the potential of the first power supply line has reached a predetermined potential after the activation of the light emitting device, and ends the signal write operation in accordance with the detection circuit detecting that the potential of the first power supply line has reached the predetermined potential.

15. The device according to claim 14, wherein a potential of the predetermined signal is the same potential as the predetermined potential.

16. The device according to claim 1, wherein the driving circuit collectively performs the signal write operation with respect to all pixels of the plurality of pixels.

17. A display device comprising the light emitting device according to claim 1, and an active element connected to the light emitting device.

18. A photoelectric conversion device comprising an optical unit including a plurality of lenses, an image sensor configured to receive light having passed through the optical unit, and a display unit configured to display an image, wherein the display unit displays an image captured by the image sensor, and includes the light emitting device according to claim 1.

19. An electronic apparatus comprising a housing provided with a display unit, and a communication unit provided in the housing and configured to perform external communication, wherein the display unit includes the light emitting device according to claim 1.

20. An illumination device comprising a light source, and at least one of a light diffusing unit and an optical film, wherein the light source includes the light emitting device according to claim 1.

21. A moving body comprising a main body, and a lighting appliance provided in the main body, wherein the lighting appliance includes the light emitting device according to claim 1.

22. A light emitting device comprising:

a plurality of pixels arranged so as to form a plurality of rows and a plurality of columns, each pixel including a light emitting element and a driving transistor configured to supply a current corresponding to a luminance signal to the light emitting element; and a driving circuit comprising a scanning circuit configured to perform write scanning of scanning the plurality of pixels on a row basis and writing the luminance signal in a gate of the driving transistor, wherein the driving circuit further includes a write circuit configured to perform, only during a period from an activation of the light emitting device to a start of the write scanning when the write scanning is performed for a first time, a signal write operation of writing a predetermined signal in the gate of the driving transistor included in a pixel arranged in at least one row among the plurality of pixels without performing scanning using the scanning circuit.

* * * * *